(12) United States Patent
Licardie et al.

(10) Patent No.: US 9,929,900 B2
(45) Date of Patent: *Mar. 27, 2018

(54) RESILIENT DATA COMMUNICATIONS WITH PHYSICAL LAYER LINK AGGREGATION, EXTENDED FAILURE DETECTION AND LOAD BALANCING

(71) Applicant: Harris Stratex Networks, Inc., Milpitas, CA (US)

(72) Inventors: Sergio Licardie, Cupertino, CA (US); Chaoming Zeng, Milpitas, CA (US)

(73) Assignee: Aviat Networks, Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/376,577

(22) Filed: Dec. 12, 2016

(65) Prior Publication Data

US 2017/0171017 A1  Jun. 15, 2017

Related U.S. Application Data

(63) Continuation of application No. 15/077,785, filed on Mar. 22, 2016, now Pat. No. 9,521,036, which is a
(Continued)

(51) Int. Cl.
*H04L 12/24* (2006.01)
*H04L 12/709* (2013.01)
(Continued)

(52) U.S. Cl.
CPC ........ *H04L 41/0668* (2013.01); *H04L 45/245* (2013.01); *H04L 45/28* (2013.01); *H04L 69/323* (2013.01)

(58) Field of Classification Search
None
See application file for complete search history.

(56) References Cited

U.S. PATENT DOCUMENTS

| 4,941,089 A | 7/1990 | Fischer |
| 6,434,165 B1 * | 8/2002 | Sherer et al. ............... 370/465 |

(Continued)

FOREIGN PATENT DOCUMENTS

| CN | 1848767 | 10/2006 |
| CN | 1949724 | 4/2007 |
| WO | 0072531 | 11/2000 |

OTHER PUBLICATIONS

European Patent Application Serial No. 08829704.9, Examination Report dated May 2, 2017.
(Continued)

*Primary Examiner* — Kouroush Mohebbi
(74) *Attorney, Agent, or Firm* — Sheppard, Mullin, Richter & Hampton LLP

(57) ABSTRACT

Rapid channel failure detection and recovery in wireless communication networks is needed in order to meet, among other things, carrier class Ethernet channel standards. Thus, resilient wireless packet communications is provided using a physical layer link aggregation protocol with a hardware-assisted rapid channel failure detection algorithm and load balancing, preferably in combination. This functionality may be implemented in a Gigabit Ethernet data access card with an engine configured accordingly. In networks with various topologies, these features may be provided in combination with their existing protocols.

26 Claims, 14 Drawing Sheets

Related U.S. Application Data continuation of application No. 14/281,746, filed on May 19, 2014, now Pat. No. 9,294,943, which is a continuation of application No. 13/305,703, filed on Nov. 28, 2011, now Pat. No. 8,774,000, which is a continuation of application No. 12/205,791, filed on Sep. 5, 2008, now Pat. No. 8,264,953.

(60) Provisional application No. 60/970,476, filed on Sep. 6, 2007.

(51) Int. Cl.
*H04L 12/703* (2013.01)
*H04L 29/08* (2006.01)

(56) References Cited

U.S. PATENT DOCUMENTS

| | | | |
|---|---|---|---|
| 6,501,749 B1 | 12/2002 | Alexander, Jr. et al. | |
| 6,512,742 B1 | 1/2003 | Alexander, Jr. et al. | |
| 6,535,489 B1 | 3/2003 | Merchant et al. | |
| 6,625,152 B1 | 9/2003 | Monsen et al. | |
| 6,675,243 B1 | 1/2004 | Bastiani et al. | |
| 6,850,486 B2 | 2/2005 | Saleh et al. | |
| 6,901,048 B1 | 5/2005 | Wang et al. | |
| 6,910,149 B2 | 6/2005 | Perloff et al. | |
| 6,928,056 B2 | 8/2005 | Evans | |
| 6,952,401 B1 | 10/2005 | Kadambi et al. | |
| 7,010,607 B1 | 3/2006 | Bunton | |
| 7,023,797 B2 | 4/2006 | Tagore-Brage | |
| 7,145,866 B1* | 12/2006 | Ting et al. | 370/225 |
| 7,230,925 B2 | 6/2007 | Li et al. | |
| 7,266,079 B2 | 9/2007 | Fan | |
| 7,529,180 B1 | 5/2009 | Karl et al. | |
| 7,551,616 B2 | 6/2009 | Devi et al. | |
| 7,613,110 B1 | 11/2009 | Blair | |
| 7,639,614 B2* | 12/2009 | Nakagawa et al. | 370/232 |
| 7,787,370 B1 | 8/2010 | Aweya et al. | |
| 7,804,761 B2 | 9/2010 | Rosenhouse et al. | |
| 7,876,747 B2 | 1/2011 | Elangovan et al. | |
| 7,898,959 B1 | 3/2011 | Arad | |
| 7,911,953 B1 | 3/2011 | Prestor et al. | |
| 8,018,843 B2 | 9/2011 | Dunbar et al. | |
| 8,094,559 B1 | 1/2012 | Bly et al. | |
| 8,264,953 B2* | 9/2012 | Licardie et al. | 370/225 |
| 8,774,000 B2* | 7/2014 | Licardie et al. | 370/235 |
| 2002/0054567 A1 | 5/2002 | Fan | |
| 2002/0105949 A1 | 8/2002 | Shinomiya et al. | |
| 2002/0167898 A1 | 11/2002 | Thang et al. | |
| 2003/0054829 A1* | 3/2003 | Moisio | 455/452 |
| 2003/0117945 A1* | 6/2003 | Zboril | 370/216 |
| 2003/0128706 A1 | 7/2003 | Mark et al. | |
| 2004/0208552 A1 | 10/2004 | Harney et al. | |
| 2004/0228278 A1 | 11/2004 | Bruckman et al. | |
| 2005/0063701 A1 | 3/2005 | Ovadia et al. | |
| 2005/0152369 A1 | 7/2005 | Ambe et al. | |
| 2005/0157759 A1 | 7/2005 | Ohno et al. | |
| 2005/0169294 A1 | 8/2005 | Tseng et al. | |
| 2005/0193309 A1 | 9/2005 | Grilli et al. | |
| 2005/0213547 A1* | 9/2005 | Meier | 370/338 |
| 2005/0281204 A1* | 12/2005 | Karol et al. | 370/248 |
| 2005/0281220 A1 | 12/2005 | Stanwood et al. | |
| 2006/0031482 A1 | 2/2006 | Mohan et al. | |
| 2006/0045031 A1 | 3/2006 | Hickey et al. | |
| 2006/0098573 A1 | 5/2006 | Beer et al. | |
| 2006/0203847 A1 | 9/2006 | Toyoda | |
| 2006/0221974 A1 | 10/2006 | Hilla et al. | |
| 2006/0251106 A1 | 11/2006 | Nakagawa et al. | |
| 2007/0189154 A1 | 8/2007 | Hourtane et al. | |
| 2007/0237172 A1 | 10/2007 | Zelig et al. | |
| 2007/0280258 A1 | 12/2007 | Rajagopalan et al. | |
| 2008/0068983 A1* | 3/2008 | Dunbar et al. | 370/216 |
| 2008/0291843 A1* | 11/2008 | Sonnenberg et al. | 370/254 |
| 2008/0305743 A1 | 12/2008 | Aithal et al. | |
| 2010/0142560 A1 | 6/2010 | Sharivker et al. | |
| 2010/0215058 A1 | 8/2010 | Yakov et al. | |

OTHER PUBLICATIONS

Brown, Andrew, "IEEE 802.17 Resilient Packet Ring (RPR) Standards Update," 27th Meeting of the North American Network Operators' Group (NANOG), pp. 1-14, Feb. 2003.

Cisco Systems, Inc., "Understanding Rapid Spanning Tree Protocol (802.1w)," white paper, Document ID: 24062, pp. 1-19, Sep. 1, 2005 [retrieved online at http://www.cisco.com/warp/public/473/146.html on Dec. 9, 2005].

IEEE Computer Society, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications," ISBN 978-0-7381-4740-6, Section 43, pp. 285-349, Jan. 1, 2005.

Light Reading Inc., "Making Sonet Ethernet-Friendly," Mar. 25, 2003 [retrieved online at http://www.lightreading.com/document.asp?doc_id=30194 on Aug. 14, 2007].

SysKonnect GmbH, "Link Aggregation According to IEEE Standard 802.3ad," white paper, v. 1.10, pp. 1-21, Oct. 10, 2002.

European Patent Application Serial No. 08795867.4, Supplementary Search Report dated Oct. 25, 2010.

European Patent Application Serial No. 08829704.9, Examination Report dated Jun. 26, 2015.

European Patent Application Serial No. 08829704.9, Supplementary Search Report dated Jan. 3, 2012.

International Application No. PCT/US2006/006722, International Search Report dated Sep. 21, 2007.

International Application No. PCT/US2008/064600, International Search Report dated Jul. 28, 2008.

International Application No. PCT/US2008/075618, International Search Report dated Nov. 24, 2008.

U.S. Appl. No. 11/753,312, Notice of Allowance dated Mar. 9, 2010.
U.S. Appl. No. 11/753,312, Office Action dated Sep. 16, 2009.
U.S. Appl. No. 12/205,791, Office Action dated Mar. 2, 2010.

* cited by examiner

Bidirectional Dual Transport Channel Packet Processing Mechanism

Keep Alive Message Insertion State Diagram

Physical Layer Link Aggregation Configuration

Physical Layer Aggregation

Link Aggregation Payload Redistribution State Diagram

Failure Detection and Recovery Flow Chart

RESILIENT DATA COMMUNICATIONS WITH PHYSICAL LAYER LINK AGGREGATION, EXTENDED FAILURE DETECTION AND LOAD BALANCING

CROSS-REFERENCE TO RELATED APPLICATIONS

This application is a continuation of and claims priority to U.S. Nonprovisional patent application Ser. No. 15/077,785, filed Mar. 22, 2016 and entitled "Resilient Data Communications with Physical Layer Link Aggregation, Extended Failure Detection and Load Balancing," now U.S. Pat. No. 9,521,036, which is a continuation of and claims priority to U.S. Nonprovisional patent application Ser. No. 14/281,746, filed May 19, 2014 and entitled "Resilient Data Communications with Physical Layer Link Aggregation, Extended Failure Detection and Load Balancing," now U.S. Pat. No. 9,294,943, which is a continuation of and claims priority to U.S. Nonprovisional patent application Ser. No. 13/305,703, filed Nov. 28, 2011 and entitled "Resilient Data Communications with Physical Layer Link Aggregation, Extended Failure Detection and Load Balancing," now U.S. Pat. No. 8,774,000, which is a continuation of and claims priority to U.S. Nonprovisional patent application Ser. No. 12/205,791, filed Sep. 5, 2008 and entitled "Resilient Data Communications with Physical Layer Link Aggregation, Extended Failure Detection and Load Balancing," now U.S. Pat. No. 8,264,953, which claims priority to U.S. Provisional Patent Application Ser. No. 60/970,476, filed Sep. 6, 2007 and entitled "Resilient Data Communications with Physical Layer Link Aggregation, Extended Failure Detection and Load Balancing," which are hereby incorporated by reference herein.

FIELD OF THE TECHNOLOGY

The technology relates to data communications and more particularly to resilient data communications in networks such as wireless data communication networks.

BACKGROUND

The requirements of extended capacity and increased reliability associated with data communication environments that allow convergence of voice, data and video, as well as storage on IP networks has created a need for carrier-class availability. Carrier-class infrastructure, also known as "carrier grade" infrastructure, is considered a relatively reliable network hardware and software infrastructure. Enterprises such as mobile wireless carriers, data access providers, and fixed wireless carriers, as well as enterprises and government institutions that operate broadband wireless networks often use carrier-class infrastructure for handling their IP communications and mission critical applications. For example, to carry voice traffic and real-time traffic in converged environments, a carrier-class network infrastructure may be configured to deliver the same level of availability as the public switched telephone network. Thus, in establishing a carrier-class infrastructure, the communications network can be deployed with topology designed to suit the needs of the particular enterprise.

A network topology is the pattern of links between nodes where a given node has one or more links to other nodes in the network. Physical topologies of networks include examples such as ring, mesh and bus. A logical topology is the nature of the paths that signals follow from node to node, and, in many instances, the logical and physical topologies are similar.

For increased bandwidth, load balancing and availability of communication channels between nodes (e.g., switches and stations), link aggregation or trunking, according to IEEE standard 802.3ad, is a method of grouping physical network links into a single logical link. With link aggregation, it is possible to increase capacity of communication channels between nodes using their Fast Ethernet and Gigabit Ethernet technology. Two or more Gigabit Ethernet connections can be grouped to increase bandwidth, and to create resilient and redundant links. Standard local area network (LAN) technology provides data rates of 10 Mbps, 100 Mbps and 1000 Mbps and, for obtaining higher capacity (e.g., 10000 Mbps) link aggregation allows grouping of 10 links. Where factors of ten (10) are excessive, link aggregation can provide intermediate rates by grouping links with different rates.

Wired network protocols are designed to meet the Ethernet set of requirements and aim to improve scalability, bandwidth allocation and throughput in order to meet the demands of packet-switched networks. A typical Ethernet physical layer interface presently meets 1 Gbps to 10 Gbps rates. In the event of fiber or node failure, recovery may need to satisfy 50 milliseconds recovery time.

Current carrier class infrastructure requirements deal with quality of service (QoS), resiliency, reliability, load balancing, response time and manageability of the communications network. Standards establishing these requirements are designed for QoS at a particular level. However, providing load balancing at layer-2 or layer-3, for instance, is difficult because it depends on upper-layer features of the traffic. Additionally, the recovery time during which a system folds back into a valid configuration takes too long, creating a convergence problem.

SUMMARY

The foregoing configurations and protocols may not be optimized for featureless load balancing among carriers and for wireless communications. Existing configurations further require excessive overhead, do not incorporate resilience at the physical layer and provide a slow failure detection and recovery response. For example, in a LAN or other type of network, a layer-2 link aggregation looks at MAC (media access control) addresses of the source and destination. In particular, a layer-2 link aggregation finds a link aggregation group number for each Ethernet frame transported through the network by performing a XOR computation on the least significant bytes (LSBytes) of the source and destination MAC addresses. The XOR computation produces a key that determines the link aggregation group to which an Ethernet frame belongs (i.e., frame membership).

In some embodiments in a physical layer link aggregation, there is a group in which members are physical links but there are no keys. Accordingly, various embodiments that implement this featureless, layer-1 approach provide resilient packet communications with the application of a physical layer link aggregation protocol, extended failure detection algorithm, load balancing, or any combination thereof. Preferably, all three are applied.

Resilient wireless packet networks with link aggregation may provide wireless operations with error resiliency and limited or minimal impact on throughput. However, optimization of such networks for physical layer traffic with featureless load balancing is exclusive of the layer-2 traffic-features-based optimization and, thereby, reduces bandwidth usage attributed to overhead. In other words, featureless load balancing at the physical layer of a multi-carrier resilient packet network is independent from layer-2 traffic features, and allows fast detection and automatic failure recovery.

Point-to-point wireless link aggregation topologies are a typical application for the resilient physical layer link aggregation. This allows deployment of wireless data communication networks with resiliency to failures through robust and fast failure detection and recovery. These embodiments may be capable of lower than 50 ms wireless link failure detection rate, per link, and below-50 ms wireless link healing (recovery) rate in a multi-carrier network topology. A multi-carrier wireless network can exhibit a unilateral and reliable end-to-end resiliency to failures through such robust and fast failure detection and recovery. It can further provide carrier class protection performance to wireless networks.

Resilient wireless packet networks, for example, are implemented using an improved Gigabit Ethernet card with functionality designed for providing these benefits. And, although this solution is capable of being implemented using external equipment such as routing devices, the improved Gigabit Ethernet card implementation is preferred because the detection and recovery signals are available locally and no additional overhead is needed. In other words, the improved Gigabit Ethernet card implementation is preferred because it provides better results with less impact on the throughput.

Hence, various embodiments of systems and methods can be provided for providing the desired resilient packet communications in a network. One exemplary method may comprise: instantiating a rapid channel failure detection algorithm, instantiating a physical layer link aggregation protocol associated with links of a network for packet communications, and combining the physical layer link aggregation protocol with the rapid channel failure detection algorithm. The combination is responsive to failures in the network and provides for automatic failure recovery of the network in order to render communications of packets through the network resilient to such failures.

Another method for resilient packet communications in a network may comprise instantiating a physical layer link aggregation protocol and instantiating a rapid channel failure detection algorithm that is operative to cooperate with the physical layer link aggregation protocol in performing, on a per-link basis, failure detection and recovery steps. The steps may include obtaining status indication containing receive status or transmit status, determining if packet traffic alignment is locked and, if not, setting the receive status to bad, determining if a packet was received, and, if not, determining if the receive status should be set to bad, computing a validity value of a packet header field that contains receive status to determine if the packet header field is valid and the receive status should be set to good, determining the transmit status from the receive status of a packet, if received, and initiating automatic failure or error recovery of the network if the transmit status and/or receive status are bad.

One exemplary system for resilient wireless packet communications may comprise: means for instantiating a rapid channel failure detection algorithm, means for instantiating a physical layer link aggregation protocol associated with links of a network for packet communications, and means for combining the physical layer link aggregation protocol with the rapid channel failure detection algorithm. Such combination is responsive to failures in the network and provides for the automatic failure recovery of the network in order to render communications of packets through the network resilient to such failures.

Another system for resilient wireless packet communications in a network, may comprise: a plurality of nodes interconnected in a network via links, each node having a data access card operative to execute a physical layer link aggregation protocol and a rapid wireless channel failure detection algorithm, and a plurality of customer data access ports for connections of the plurality of nodes to the network. Then, in order to render communications of packets through the network resilient to failures, the physical layer link aggregation protocol and the rapid channel failure detection algorithm are operative to cooperate with each other and to enable automatic failure recovery of the network in response to failures.

In implementing the foregoing embodiments, various system and/or method aspects may be included. These aspects may relate directly or indirectly to the physical layer link aggregation protocol, rapid channel failure detection algorithm and load balancing.

For instance, the physical layer link aggregation protocol typically includes creating the link aggregation group by logically grouping links to operate, in combination, as a single virtual link in order to increase capacity. The rapid channel failure detection algorithm is preferably extended from failure status detection of all the links in a link aggregation group to per-link failure status detection. The per-link failure status detection provides individual end-to-end status for each link in the network involved in the physical layer link aggregation protocol. Thus, unless all links that participate in the link aggregation group have failed, the link aggregation group maintains a 'good' status condition, all-be-it at a reduced capacity, and when any of the failed links recovers the capacity increases accordingly. The failure recovery includes prompting the physical layer link aggregation protocol to redistribute packet traffic flow to link aggregation group members that remain in 'good' condition and restore traffic flow to links that recover to 'good' condition and rejoin the link aggregation group. Also, the rapid channel failure detection algorithm is autonomous in the detection of failures in that it is independent from other network system failure indications, and it is agnostic to the number of hops required for transporting payloads through the network. The traffic flow is preferably restored to any failed link aggregation member once the failure condition associated with it disappears. Thus, the physical layer link aggregation protocol is dynamic. Moreover, because of the layer-1 implementation, the physical layer link aggregation protocol is featureless (e.g., independent of MAC or IP address).

The physical layer link aggregation protocol and rapid channel failure detection algorithm are preferably implemented in a data access card to effect configuration of ports that are associated with the data access card, including selection of port aggregates to create logical groupings of ports. The data access card preferably includes an engine for performing functions associated with the combined physical layer link aggregation protocol and rapid channel failure detection algorithm. The engine can be implemented in a logic circuit, an FPGA (field programmable gate array) or an ASIC (application specific integrated circuit).

Preferably also, the physical layer link aggregation protocol is implemented to operate with load balancing, wherein, for load balancing, each frame, or each group of frames, is segmented and associated with a particular link aggregation group. For instance, the segmentation is performed uniformly, on a boundary of a byte, word or frame, based on capacity or speed of links is the link aggregation group, or any combination thereof. For each segmentation performed on a frame or group of frames a reassembly is correspondingly performed to reconstruct such frame or group of frames. Each segmentation and its corresponding reassembly are configured for similar boundaries. Moreover, Each link has transmit and receive ends, and when segmentation is applied at the transmit end its corresponding reassembly is applied at the receive end in order to maintain substantial alignment of traffic flow at the transmit and receive ends. The transmit and receive ends cooperate to handle frames or groups of frames, serially, in parallel or in interleaved mode.

In implementing the various embodiments, the network may be a wireless communications network. In such cases, the network includes wireless links between a plurality of nodes, and each node has a transmit status and a receive status associated therewith. The transmit status at a particular node is a reflection of the receive status at another, far-end node that is wirelessly linked to that particular node.

In a typical implementation, the rapid channel failure detection algorithm formats packets with an extended header field that contains receive status information and a header integrity field. The header integrity field contains and indicia of integrity such as a calculated checksum (CRC). The reflection of the receive status from which the transmit status is derived is obtained from the receive status of packets received from a far end node, wherein failure in a particular node is determined based on whether its associated receive and/or transmit status are bad. The rapid channel failure detection algorithm may be independent from the presence of payload in packets transported through the network, and in the absence of payload it inserts keep-alive packets to maintain link status. The rapid channel failure detection algorithm inserts the keep-alive packets at a predetermined rate based on network traffic load. The rapid channel failure detection algorithm is operative to provide wireless operations with error resiliency, and wherein the number of possible successive error packets is adjusted to filter out error bursts including fewer than a predetermined number of such packets. The rapid channel failure detection algorithm determines a 'good' transmit or receive status upon detecting a predetermined number of successive packets with valid integrity an indicia of which is the calculated checksum (CRC).

As described above, the rapid channel failure detection algorithm is preferably hardware-assisted and operative to provide network end-to-end failure detection and recovery. The rapid channel failure detection algorithm discovers a failure in either direction, transmit or receive, independently, and a failure in one direction does not prevent traffic flow in the opposite direction. The rapid channel failure detection algorithm determines the presence of a failure condition when there is one or more of a traffic alignment error, a packet exceeds a timeout and a packet integrity error threshold is exceeded. The rapid channel failure detection algorithm continues to operate in the presence of failures and errors once detected.

In sum, various embodiments provide resilient packet communications using a physical layer link aggregation, extended rapid channel failure detection and load balancing, as illustrated herein. These and other features, aspects and advantages of various embodiments will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the various embodiments and together with the description, serve to explain the principles associated therewith. Wherever convenient, the same reference numbers will be used throughout the drawings to refer to the same or like elements.

DETAILED DESCRIPTION

The following description is provided in the context of this Application and its requirements to enable a person of ordinary skill in the art to make and use the claimed invention. Various modifications to the embodiments described and shown are possible and various generic principles defined herein may be applied to these and other embodiments. Thus, the claimed invention is to be accorded the widest scope consistent with the principles, features and teachings disclosed herein.

Generally, various embodiments relate to data communications in networks such as wireless communications networks with carrier-class infrastructure. To improve their performance, such networks may rely on resilient wireless communication techniques. This applies, for instance, to extended capacity, redundancy, load balancing, resiliency, reliability, response time and manageability of communications networks.

In split-mount wireless radio systems, such as the Eclipse™ platform from Harris Stratex Networks, Inc., of Morrisville, N.C., the links are provided via an outdoor unit (ODU). In such wireless radio platform implementations, the nodes often include DACs to facilitate communications between them. Therefore, the design for achieving improved performance may include modifying existing DACs.

Figure 1:
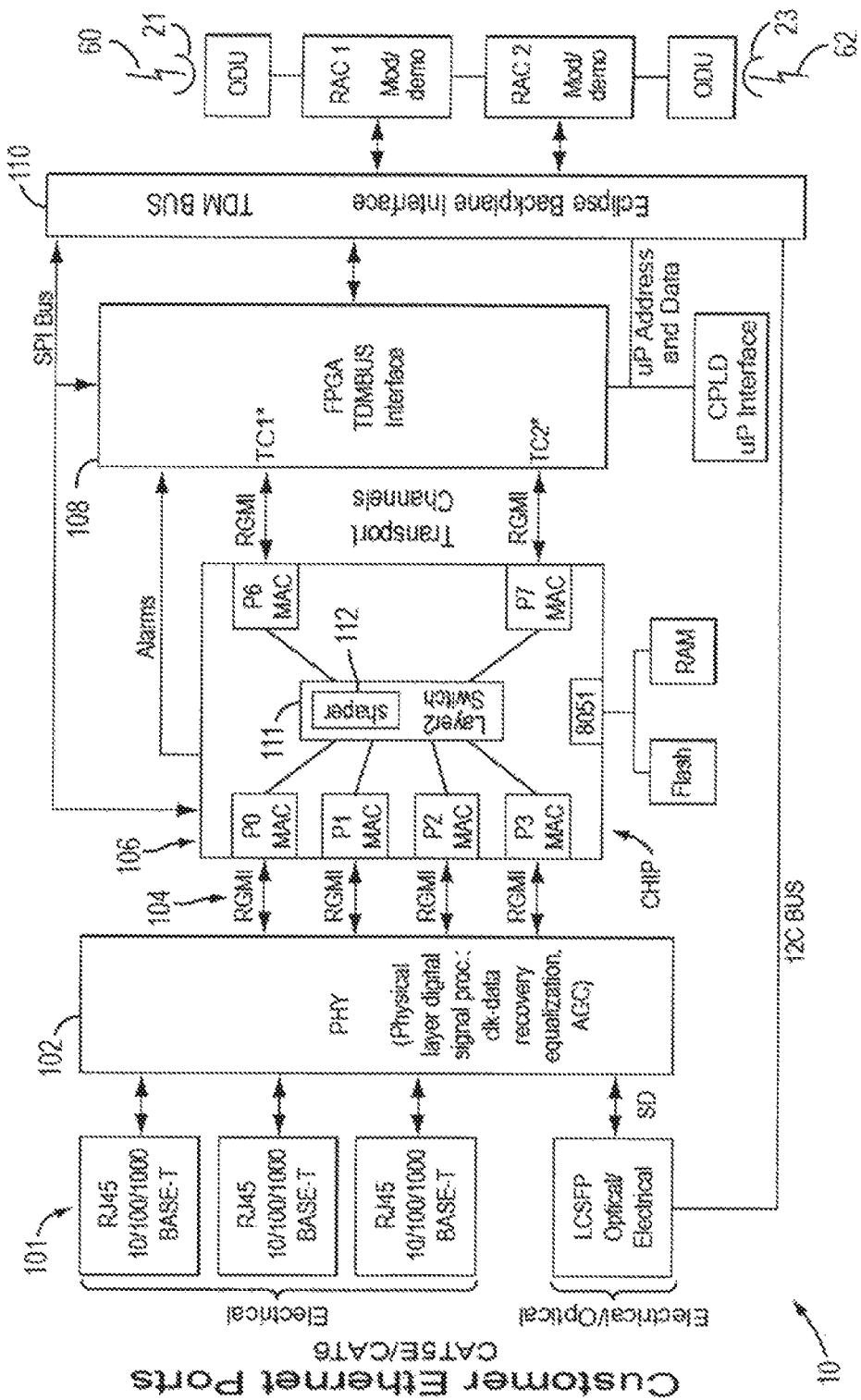
FIG. 1 is block diagram of an existing Gigabit Ethernet data access card (DAC).

To illustrate, FIG. 1 is block diagram of an existing DAC. As shown, a physical link for delivering payload in a wireless network may include a carrier channel with physical media components such as a physical layer link aggregation engine, a backbone interface, a modulator/demodulator, intermediate frequency (IF) interface, ODU and antenna. Therefore, the building blocks in the DAC provide layer-2 switching capabilities, payload transport and configuration, monitoring and control functions. The Ethernet data streams payload received in the customer Gigabit Ethernet ports 101 is processed by a physical layer digital processing component 102. A layer-2 switch 111 operates at the data-link layer (or layer 2) of the Open Systems Interconnection (OSI) reference mode. For forwarding Ethernet data streams from the physical digital processing component 102, the switch 111 analyzes their source and destination media access control (MAC) addresses and determines the output port over which the payload will be delivered (e.g., P0 . . . 3).

For the payload delivery, in addition to the above information, internal and external virtual LAN information, traffic priority, configured throughput and buffer capacity also play a role. Using such information, the switch 111 applies policing, scheduling and/or shaping algorithms to determine path and priority that each packet should take and whether it should be consumed, forwarded or dropped. To this end, the switch 111 includes a shaper 112 in communicating relationship with a forwarding engine of the switch 111. The shaper functions to shape the data streams being forwarded, including following the traffic rules in aligning the data streams and scheduling the traffic. A shaper 112 may include queues for sorting message and a scheduler for computing release times.

The data link layer may be layer-2 of the OSI model or the TCP/IP reference model, and, as such, it responds to service requests from the network layer (layer-3) and issues service requests to the physical layer (layer-1). This is a layer that provides functional and procedural means for data transfer between adjacent nodes and it may provide for error detection and correction that may occur in the physical layer. Some data link protocols might include a handshake or reception and acceptance acknowledgment as well as checksum verification to increase reliability. The data link layer is split into media access control (MAC) and logical link control (LLC) sub-layers. For each physical device type, the MAC sub-layer uses MAC addresses. In a LAN or other network, the MAC address is a node's unique hardware identifier that a correspondence table relates to the node's IP address; and on an Ethernet LAN, it's the same as the node's Ethernet address.

To carry out packet processing functions, a DAC typically includes a processing engine 108, e.g., an FPGA, ASIC or CPLD-based processing engine. In particular, when packets are delivered to transport channels TC1/TC2 through ports P6/P7, the processing engine 108 transforms the packets into suitable blocks (with associated time slots). These blocks are carried by the backplane interface 110 and by the radio link(s) 60. Although the number of transport channels and the carrier time slots (with independent timing) is configurable in the DACs, existing implementations use overhead information to resolve possible clock variations among the carriers.

Figure 2A:
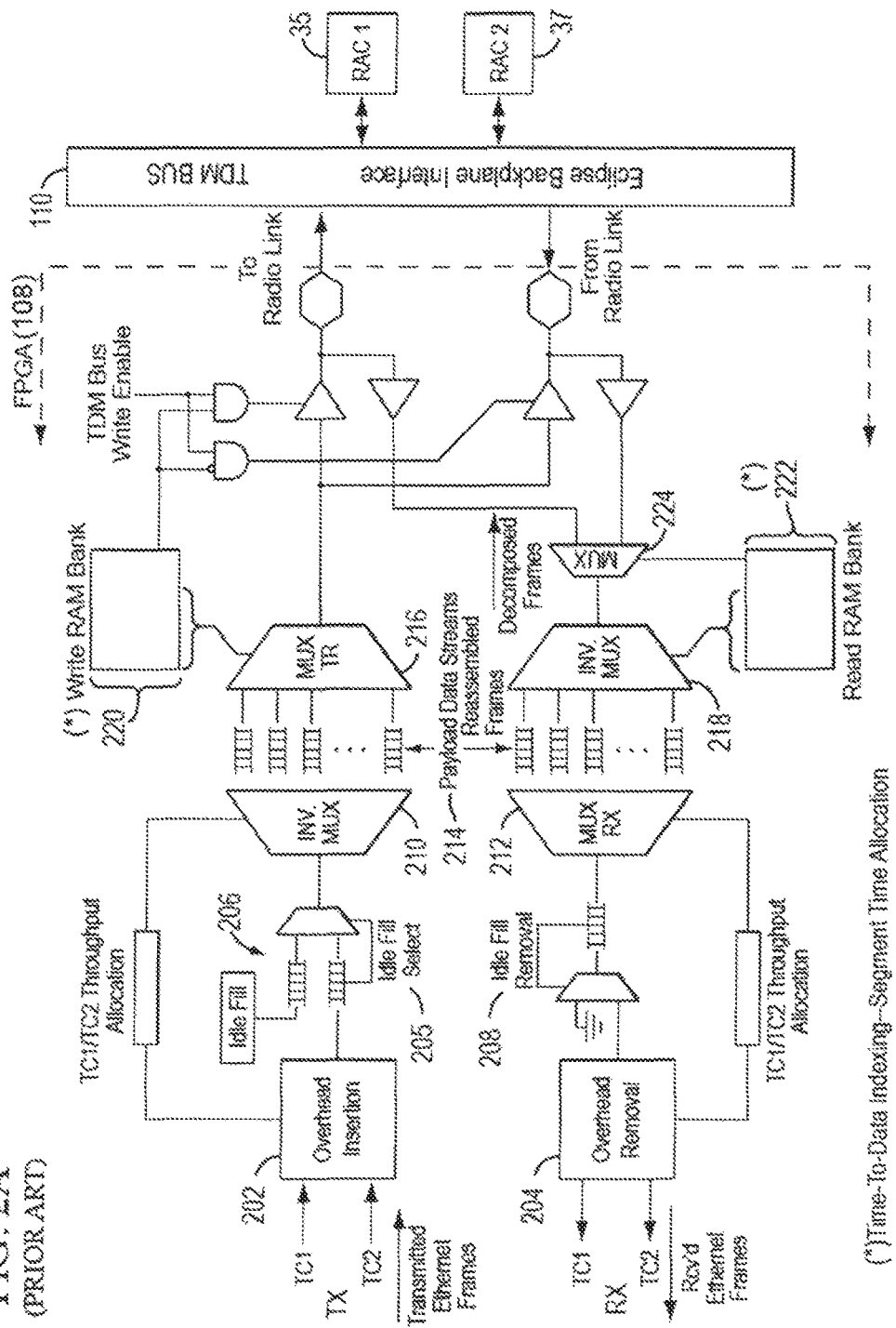
FIG. 2A is a block diagram showing the overhead used in a processing engine within an existing DAC.

FIG. 2A illustrates the overhead used in a processing engine within a DAC in the prior art. In one instance, the processing engine is a field programmable gate array (FPGA)-based dual transport channel packet processing mechanism. The FPGA-based processing engine configuration can be replaced with any suitable logic circuitry, however.

As shown, in the wireless transmit (TX) direction, when an Ethernet packet arrives at TC1 or TC2 the overhead insertion module 202 in an FPGA-based processing engine 108 applies to it a high-level data link control (HDLC)-like encapsulation. A segmentation process is carried out by an inverse multiplexer 210 that divides the incoming frames into the configured number of segments and associates to them time slots and virtual containers (links) that will be used for the transport (bandwidth allocation). The inserted overhead (encapsulation) allows for the later synchronization of the multiple segments with time slots. These segments are transferred across the backplane interface to a radio access card (RAC) 35, 37 that will transmit them through a wireless link. A byte-synchronous idle fill is inserted 206 in the transport channel stream when no payload is present.

In the wireless receive (RX) direction, the RAC will receive from the outdoor unit (ODU) frames that contain the multiple segments via links with time slots that are being used to transport the Ethernet payload. These segments are transferred via the backplane interface 110 to the DAC. The multiplexer (MUX) 212 in the DAC, reassembles the original Ethernet packets from the multiple segments based on the time-to-data indexing information from the memory 222. To guarantee the integrity of the packet, a byte synchronization stage is present. The aforementioned overhead information is used to offset any clock differences that each of the independent segments used for transporting might have, effectively aligning them back to the original packet layout. Any idle fill present in the transport channels is removed 208 so it never reaches the layer-2 switch (item 111, FIG. 1). The encapsulation is then removed 204 and, using the TC1 and TC2 interfaces, the packet is transferred to the layer-2 switch.

Figure 2B:
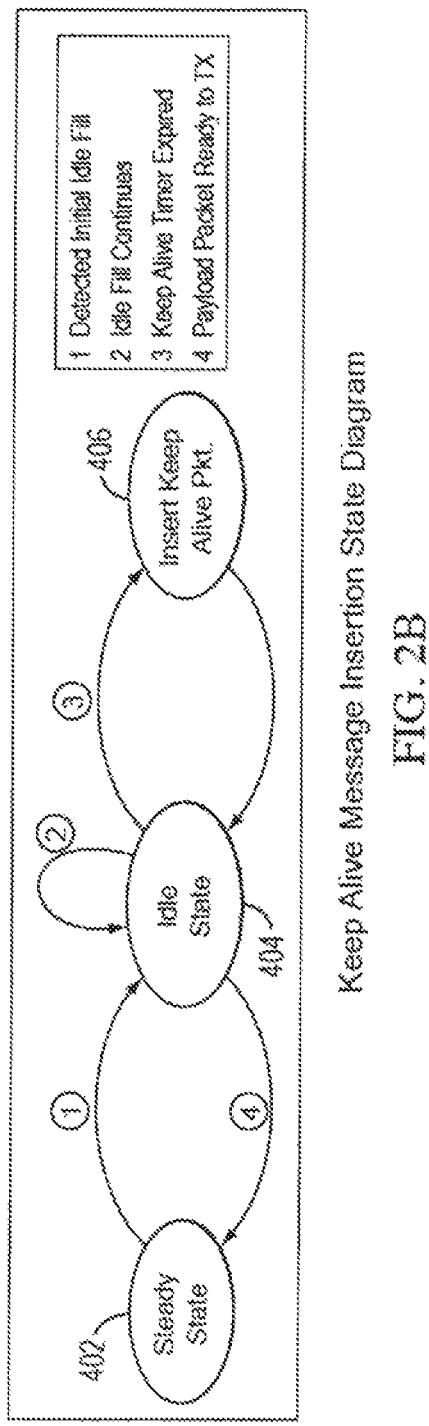
FIG. 2B is state diagram showing keep-alive message insertion.

FIG. 2B is a state diagram that shows the insert keep-alive packets operation. As shown, after a channel idle condition is detected the failure detection algorithm transitions from steady state 402 to an idle state 404. The packet fill continues while in the idle state 404 and before the keep-alive timer expires 406. When the payload is ready to transmit again, the algorithm transitions to the steady state 402.

Since keep-alive packets are only inserted when the channel is idle the amount of overhead due to such packets is minimal. The delay introduced by these packets is sufficiently small and almost undetectable because the size of these packets is so small. In the worst case scenario a new packet ready and waiting to be transmitted will be delayed by the insertion of only one keep-alive packet, assuming that the arrival of the new packet matches the expiration of the keep-alive insertion timer under idle traffic conditions.

Among other things, the approach of using multiple physical links to transport data traffic between nodes is typically intended to achieve increased link availability and bandwidth while avoiding loop formation. Thus, when a link aggregation group (LAG) is created, otherwise independent physical links are combined into a group to operate as members of a single virtual link (a single logical link). As mentioned, a DAC includes a plurality of ports, virtual containers (time slots), and link aggregation or trunking which involves logically grouping a set of ports and/or virtual containers so that two network nodes can be interconnected using multiple links.

Figure 3A:
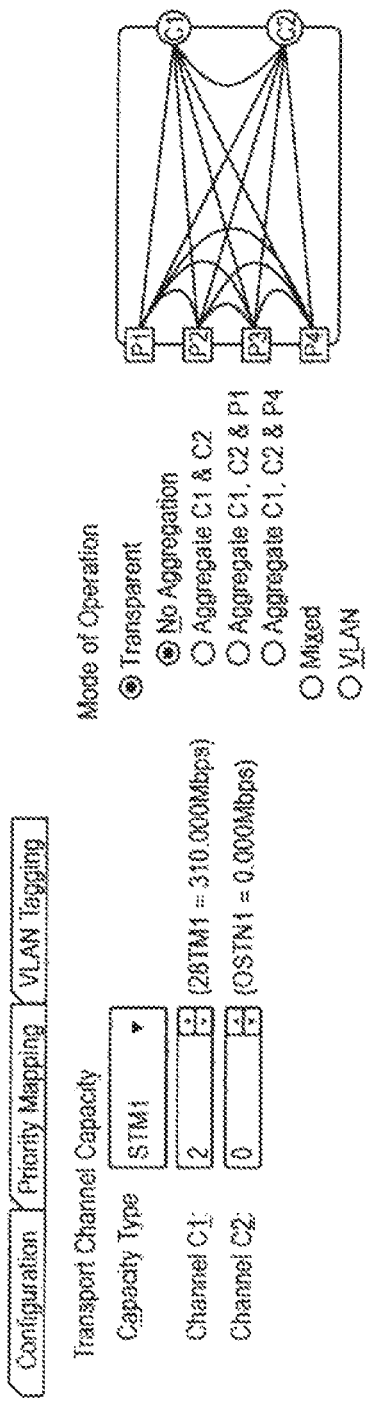
FIG. 3A illustrates the user interface of a physical layer link aggregation configuration program.

FIG. 3A illustrates the user interface of a physical layer link aggregation (port) configuration program. As can be seen, the selection of port aggregates can create various logical groupings of ports. Such logical grouping of ports increases link capacity and availability between network nodes.

Conventionally, link aggregation can be implemented at different levels in the protocol hierarchy and depending on the OSI level, it will use different information to establish which frames (or segments thereof) will be transported over the different links. A layer-2 link aggregation implementation uses the MAC addresses of the source, destination or both. A layer-3 implementation uses the corresponding IP addresses; and higher layer implementations can use logical port information and other layer relevant information. And although either one of the layer-1, layer-2 or layer-3 solutions can be implemented, only one of these solutions can be deployed in a particular installation via software configurations (using, e.g., control code or other means to determine which approach is activated). Because devices can be deployed with all three approaches, any one of these, layer-1, layer-2 or layer-3 solutions, can be activated in the field.

Generally, however, load balancing is not optimized in conventional infrastructures because it is possible that all frames end up in one transport channel or the other. Moreover, the distribution is dependent on features, e.g., MAC address, of the frames. Indeed, in the event of a link failure the whole link aggregation bundle will collapse and stop carrying traffic. And, as layer-2 solutions do not fully address resiliency and redundancy problems because they don't optimize load balancing, these problems may be better addressed with layer-1 link aggregation.

Accordingly, in this instance, the resilient wireless physical layer link aggregation (RWPLLA) is a layer-1 solution. Specifically, layer-1 link aggregation is combined with the application of a rapid carrier failure detection (RCFD) algorithm together with the necessary housekeeping functions in order to produce RWPLLA.

Figure 3B:
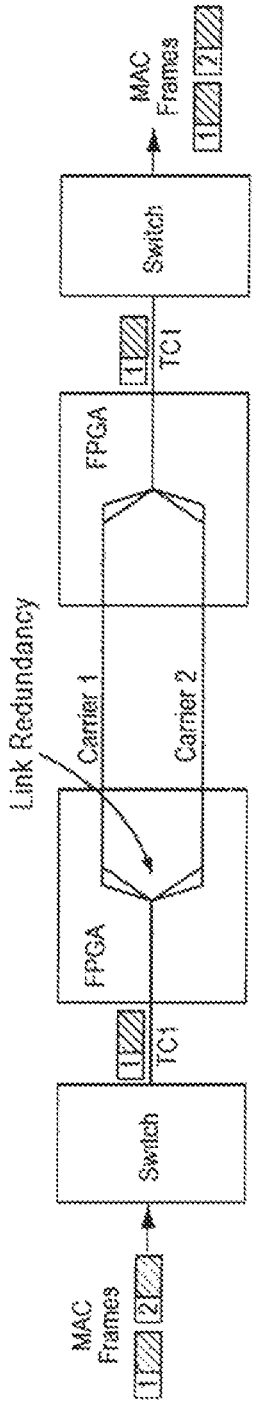
FIG. 3B is a diagram showing link redundancy configuration with physical layer link aggregation.

Inherently, the layer-1 solution has an additional benefit of unilateral (unidirectional) failure detection and faster reaction time to failures. Also, because the physical layer represents a true physical connection it doesn't rely on higher-layer features (e.g., MAC/IP address features of frames) to deliver frames. Namely, the data transport is featureless and, in turn, the layer-1 link aggregation is featureless. Additionally, the failure detection and physical layer link aggregation require less overhead then earlier solutions. Furthermore, some implementations can provide featureless load balancing within the link aggregation bundle and carrier class redundancy among the participating carriers, as shown in FIG. 3B.

With layer-1 link aggregation each group has physical link (carrier) members, and, being featureless there is no need in this approach to use keys associated with the members of each group. Moreover, a preferred RCFD and recovery is implemented as hardware-assisted RCFD and recovery and it uses a per-link (or per-carrier) status approach rather then a global status approach. A carrier includes the physical media for carrying data streams where a set of different data streams (a data container) can be carried by the same physical media.

Note that connections, carriers, links, channels, and the like may refer to logical connections, physical connection or both. In the context of link aggregation these may be collectively referred to as "links" and a link aggregation group whose members are links, channels or carriers may be often referred to as a "transport channel" or a "trunk."

Based on the foregoing, in order to achieve improved performance, one approach modifies a data interface card such as the above-described DAC. Various embodiments of the modified DAC can be deployed in new as well as existing wireless communication platforms such as the Eclipse™. In various exemplary embodiments we present a modified Gigabit Ethernet card which we refer to as the "DAC-GE."

The layer-1 link aggregation combined with the RCFD algorithm provides an improvement over layer-2 link aggregation; although both may include principles on which the RCFD algorithm is based, as described in U.S. patent application Ser. No. 11/351,983, filed Feb. 10, 2006, which is incorporated herein by reference. The RCFD algorithm preferably employs individual end-to-end status for each participating carrier in order to detect failures in individual carriers associated with a transport channel on the DAC-GE. Although the failure detection can be done on a per-carrier basis, housekeeping and re-configuration may be done collectively based on the individual carrier status results.

Figure 4:
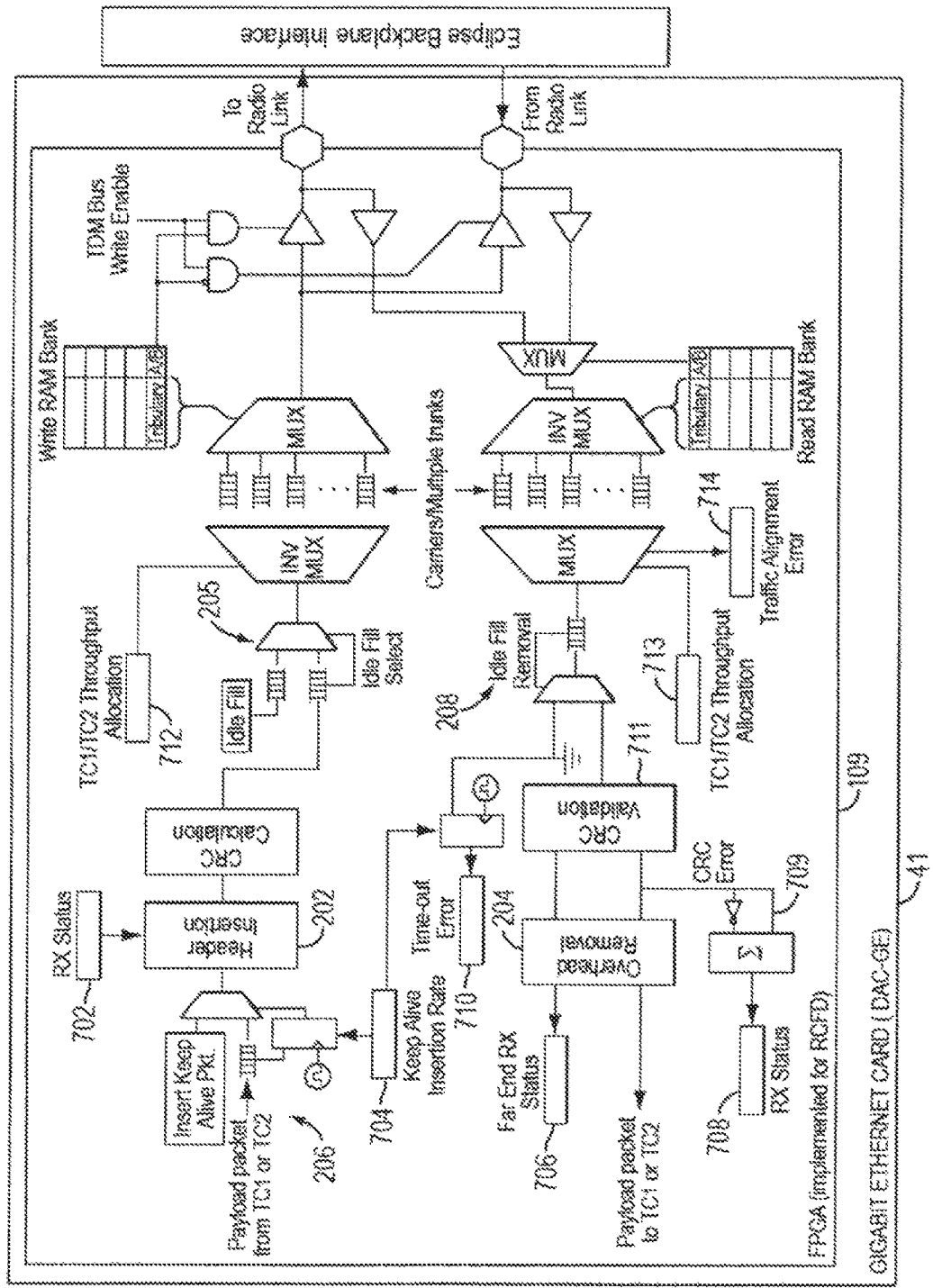
FIG. 4 is a block diagram illustrating an FPGA (field programmable gate array)-based implementation for rapid channel failure detection (RCFD) in a DAC-GE.

FIG. 4, illustrates a processing engine 109 in a DAC-GE (a modified DAC) 41 designed to perform the foregoing functions (the embodiment shown has some elements in common with the DAC of FIG. 2 with like designation numbers). Note that other configurations of the processing engine are possible although the preferred design employs a hardware-assisted implementation in an FPGA, CPLD, ASIC-based processing engine or other logic circuitry (we refer to these implementations collectively as the "FPGA-based processing engine" or simply "processing engine").

As implemented, the health of a carrier (physical link) is conveyed in an extended header to nodes on both sides of the link (e.g., at each end of the wireless communication link). Specifically, the processing engine 109 in the DAC-GE 41 at each node keeps the extended header with the TX and RX status information. The RX status is computed based on information obtained from the traffic alignment indicator 714 as well as the received packets and their integrity. The TX status is a reflection of the far end node's RX status indicator that is conveyed in the header of the received packets. In this design, a set of configurable registers allows adjustment of the system behavior to meet particular carrier class specifications.

These registers are: keep-alive insertion rate, packet receive timeout, CRC (cyclic redundancy check) validation threshold and CRC error threshold. The keep-alive packet insertion rate register 704 represents the rate in microseconds that the packet insertion engine will wait before inserting a keep-alive packet (under idle traffic conditions). The packet receive timeout register 710 represents the number of microseconds that the receive engine will wait for a packet before declaring an idle RX timeout. The CRC validation threshold register 711 represents the number of consecutive good CRC packets that will have to be received in order to change RX status from bad to good. The CRC error threshold register 709 represents the number of consecutive bad CRC packets that will have to be received in order to change RX status from good to bad. The two configurable CRC registers provide a hysteresis to avoid bad-good status oscillations on a small number of errors.

Typically, the DAC encapsulation into an "HDLC like" packet structure of Ethernet frames received on TC1 or TC2 is used for synchronization purposes. However, for the purpose of achieving the improved performance with RWPLLA and RCFD, a different packet structure is proposed with the addition of a header field extension such that redundancy and status information can be transferred without too much additional overhead. The extra header field conveys RX status, and a CRC (checksum) guarantees the integrity of the header information.

Figure 5:
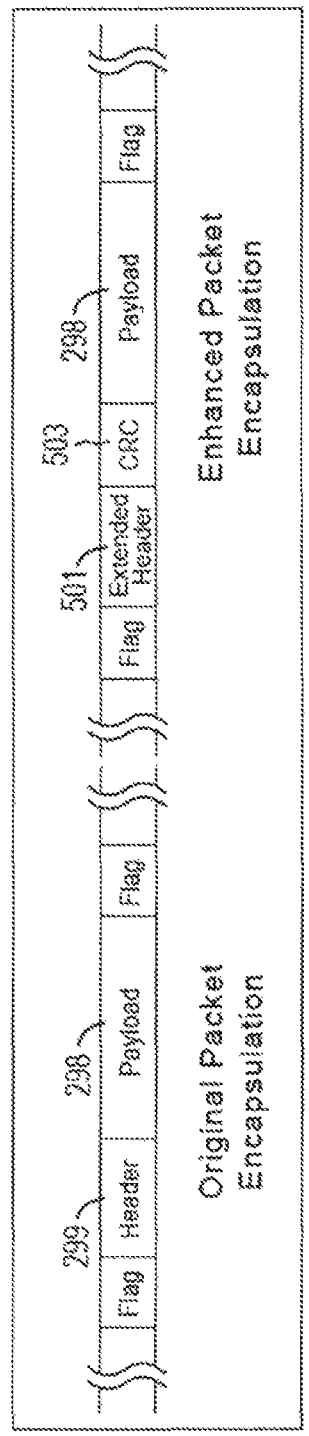
FIG. 5, illustrates an enhanced Ethernet packet encapsulation for RCFD.

FIG. 5 shows the proposed header field extension 501 and the CRC field 503 alongside the payload field 298. The extended header field 501 includes receive and transmit (TX, RX) status information.

Figure 6:
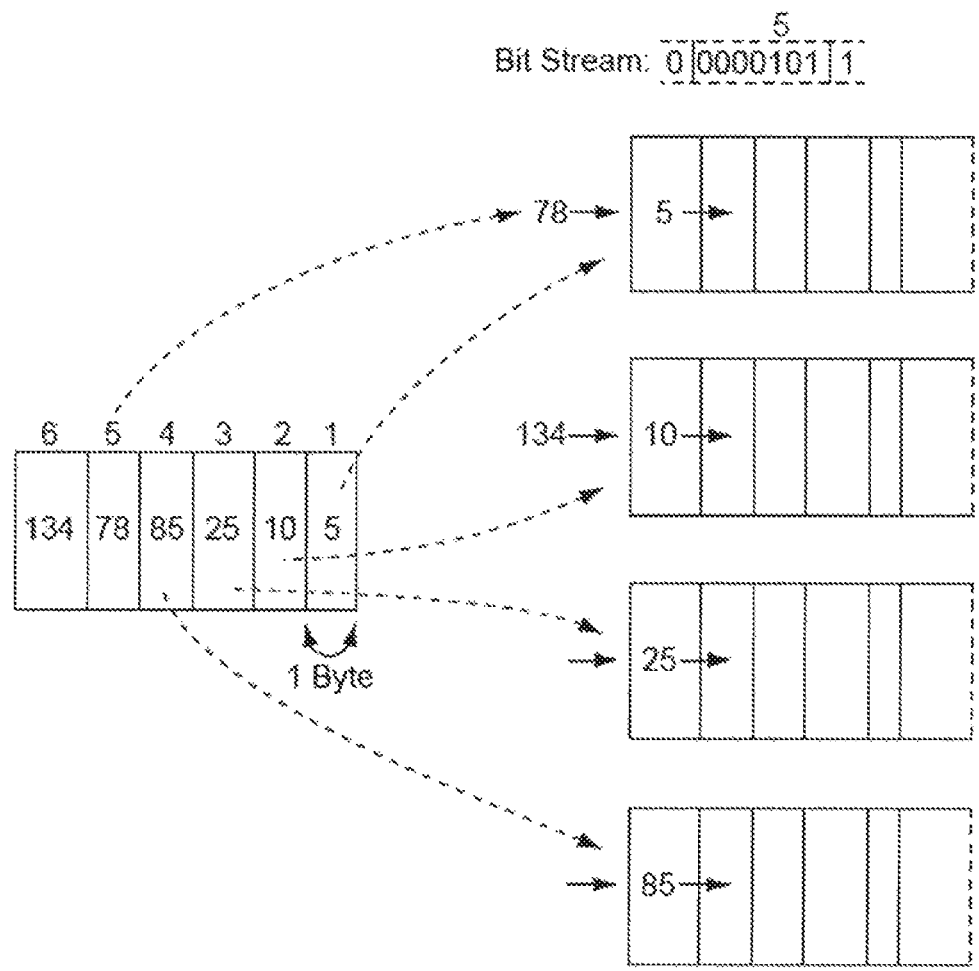
FIG. 6 illustrates packet traffic alignment.

The traffic alignment is intended for maintaining the integrity of packets that have been divided into segments and need to be re-constructed properly. As shown in FIG. 6, for instance, the bit stream of a packet with is segmented with a first byte ('5') going to a first container, a second byte ('10') going to a second container, and so on. With four containers in this example, the fifth byte ('78') also goes to the first container and the first byte is pushed to the right.

Figure 7:
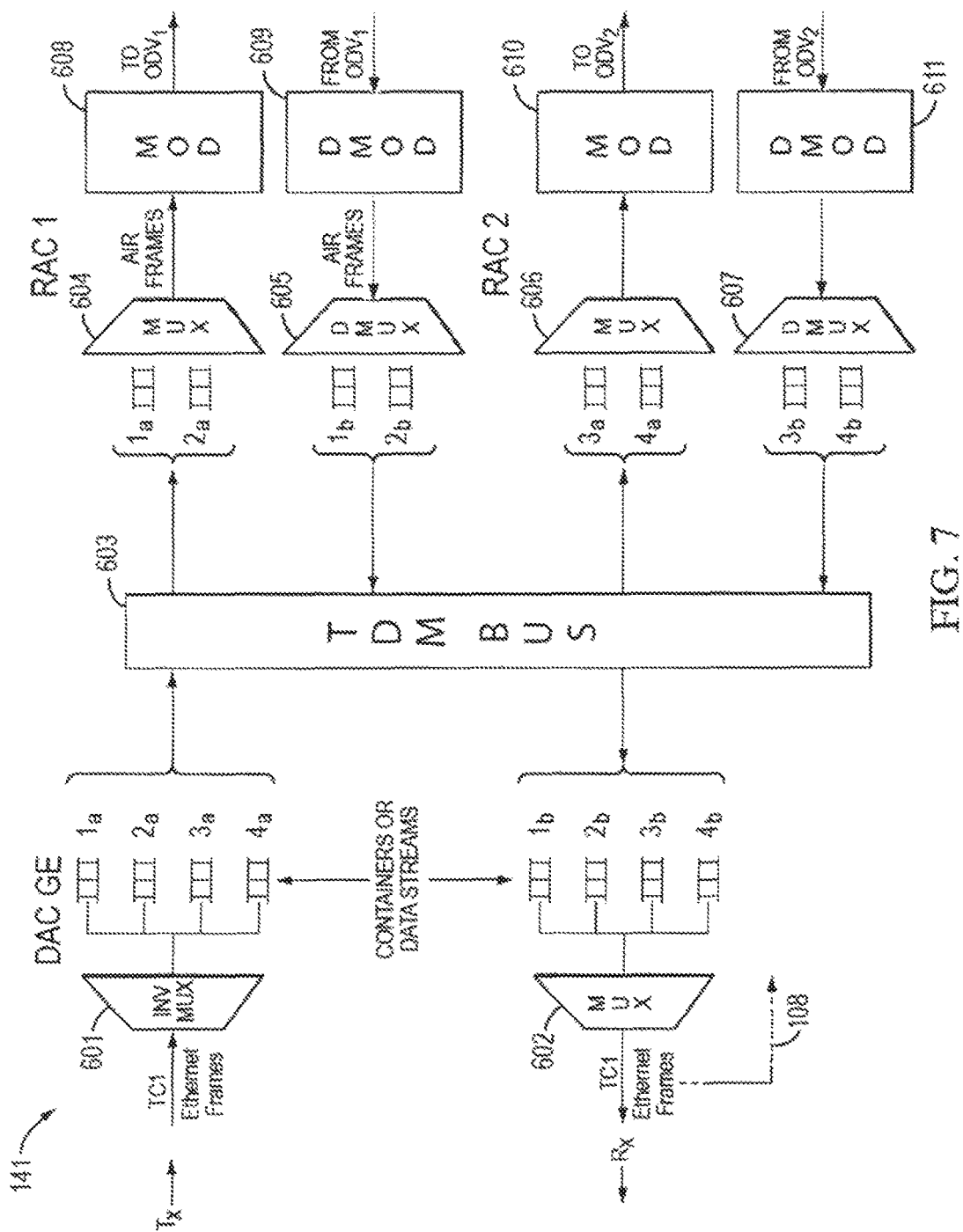
FIG. 7 illustrates disassembly and construction of Ethernet data stream traversing the two radio channels in a DAC-GE and two RACs.

FIG. 7, illustrates decomposition into segments and re-composition of data streams as implemented in a node with a dual channel configuration. With such configuration, a node may include a dual channel DAC-GE interfaced via a TDM bus with a pair of radio access cards (RAC1 and RAC2). The TX/RX carriers, TC1 and TC2, receive/transmit Ethernet frames to/from the processing engine 108 in the DAC-GE. When receiving an outgoing data stream (TX data stream) the inverse multiplexer 601 disassembles the TX data stream into four segments, creating a container of four data streams (1a, 2a, 3a, 4a). The TDM bus 603 transports the disassembled TX (four data streams) with two of the four data streams going to the first RAC (RAC1) and the other two going to the second RAC (RAC2). In each of the RACs, a respective multiplexer 604,606 assembles an air frame from an assembly of the two data streams (1a,2a and 3a,4a, respectively). A modulator 608 and 610 in each RAC modulates the respective air frame and the modulated air frames (wireless packet) is sent to the respective ODU1 and ODU2, for wireless transmission. That is, in a dual channel configurations the TX data stream is sent in two parts, one part (segments 1a,2a) through RAC1 and a second part (segments 3a,4a) through RAC2.

For incoming (RX) data streams, the ODUs receive separate parts of the wireless packets and respective demodulators 609,611 demodulate them to recreate the air frames. The demodulated air frames are each disassembled by the corresponding inverse multiplexers 605, 607 into two segments 1b,2b, and 3b,4b, respectively. These segments are passed via the TDM bus 603 to the DAC-GE for re-assembly by the multiplexer 602.

Existing techniques for reassembling the original TX data streams require that all parts of the transmitted data stream be present and aligned for proper reassembly of the original TX data stream (i.e., to allow proper reassembly of the Ethernet frame). The incoming data streams are 'featureless' in that they do not have any layer-2 attributes such as MAC addresses. Thus, if one of the physical links fails the system may loose all the payloads associate with such link because there is no way to quickly know which link failed. A physical link failure would prevent reconstruction of data streams and with such loss of data it would render the communication system deficient or even inoperable.

However, with a modified DAC such as the DAC-GE with the hardware-assisted FPGA-based physical layer link aggregation engine, when a physical link failure occurs such engine can re-direct the data streams to the remaining links (remaining members of the link aggregation group). An RCFD managed by such physical layer link aggregation engine is based on an end-to-end, per-link status monitoring and results in minimal disruption of communications. This hardware-assisted, quick failure detection of individual links may increase the load on the remaining operable links for a while but it will operate to preserve connectivity between nodes and allow continued reception of substantially all transmitted data.

As noted before, the approach of using multiple physical links to transport data traffic between nodes is typically intended to achieve increased link availability and bandwidth while avoiding loop formation (e.g., the ability to operate at twice the speed when using two radio links). However, the detection and the switching in an existing system would commonly be made within 100 ms; and failure recovery could take seconds using a standard messaging approach. Thus, to achieve or exceed carrier class Ethernet transport channel standards the link aggregation depends on fast failure detection and recovery.

Advantageously, a RWPLLA in combination with a hardware-assisted RCFD algorithm allows failure response and recovery within hundreds of microseconds as compared to the standard approach that would normally take up to seconds. The redundancy characteristics of a LAG in combination with the rapid channel failure detection algorithm operate to redirect the traffic among the remaining reliable physical links. The switching and queuing of the packets is reorganized by a link aggregation control task residing in the shaping engine of a layer-2 switch. Therefore, the physical layer link aggregation engine in the DAC-GE preferably includes an RCFD engine and the aforementioned layer-2 switch and shaping engine. More details on such engine and on failure detection and recovery will be provided below.

Figure 8:
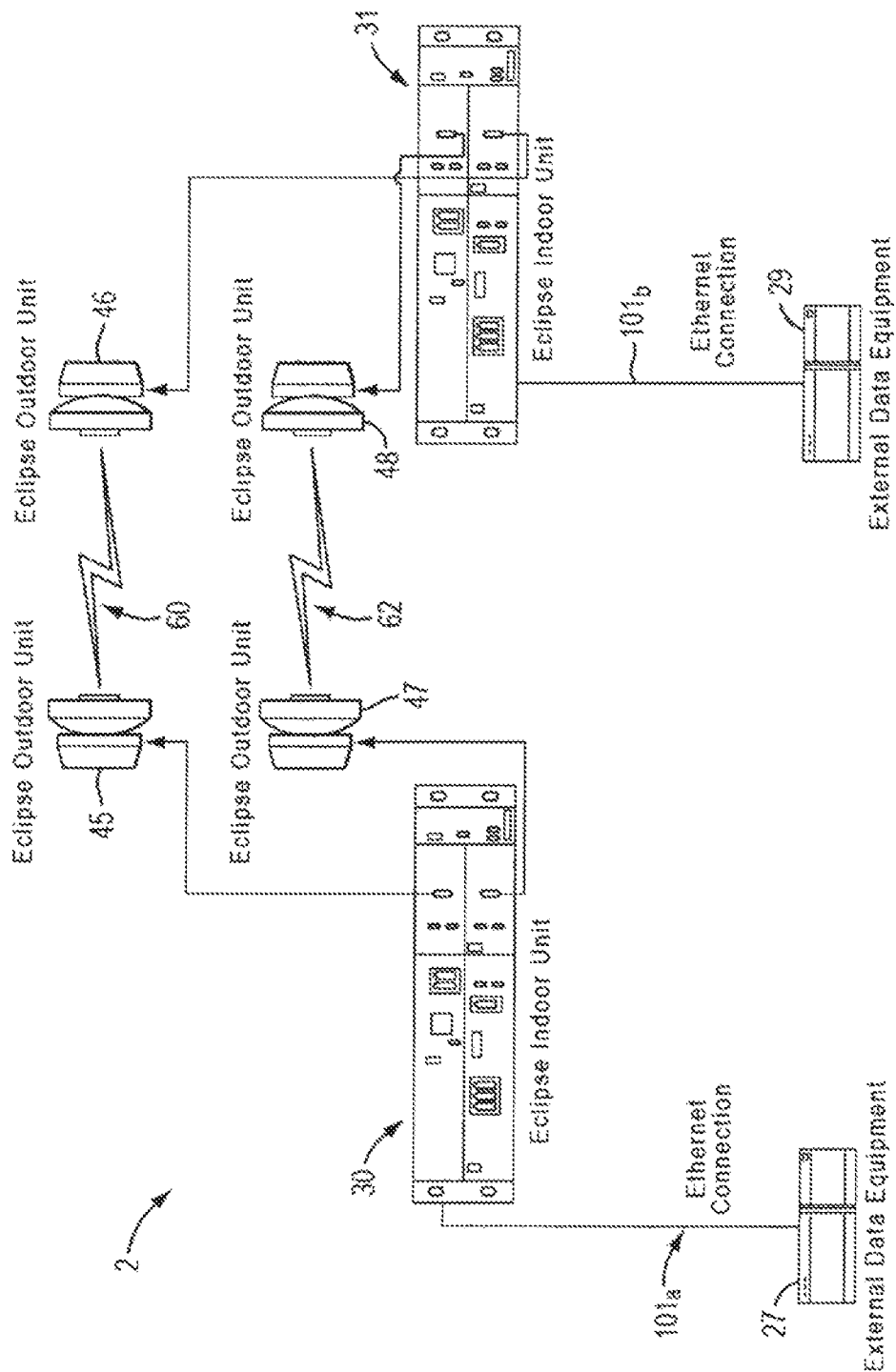
FIG. 8 is a wireless network configured for physical layer link aggregation with a modified Gigabit Ethernet data access card (DAC-GE).

First, however, FIG. 8 illustrates deployment of a modified DAC in a wireless communications network, such as a network based on the aforementioned Eclipse™ platform. The illustrated Eclipse™ wireless communication system includes two nodes, each with a split-mount configuration that includes an intelligent node unit (INU) 30, 31 operatively interfaced with dual ODUs 45,47 and 46,48, respectively. The INU includes the DAC-GE and RAC1 and RAC2 (not shown) for effecting the communications of data streams between the nodes as described above. The Ethernet data streams are conveyed via Ethernet connections 101 between each INU and external data equipment 27,29. Advantageously, the illustrated wireless communication system is configurable for link aggregation where the wireless data traffic uses two radio paths 60 and 62 between the two nodes.

It is worth noting that the RCFD algorithm is resilient to error propagation and eliminates unnecessary switchover. Because of the fast detection of a link failure or fading conditions the wireless communication system will rapidly switch to a single link (60 or 62).

Additionally, taking advantage of the per-link, unidirectional failure detection capabilities of the RCFD algorithm, a system with physical layer link aggregation could have an asymmetric behavior by having the full link throughput available in one direction while using only a limited throughput (due to unidirectional link failure) in the other. This is the case of video-broadcasting systems or other applications that heavily use broadcast or multicast transmission or that are asymmetric in nature.

Figure 9:
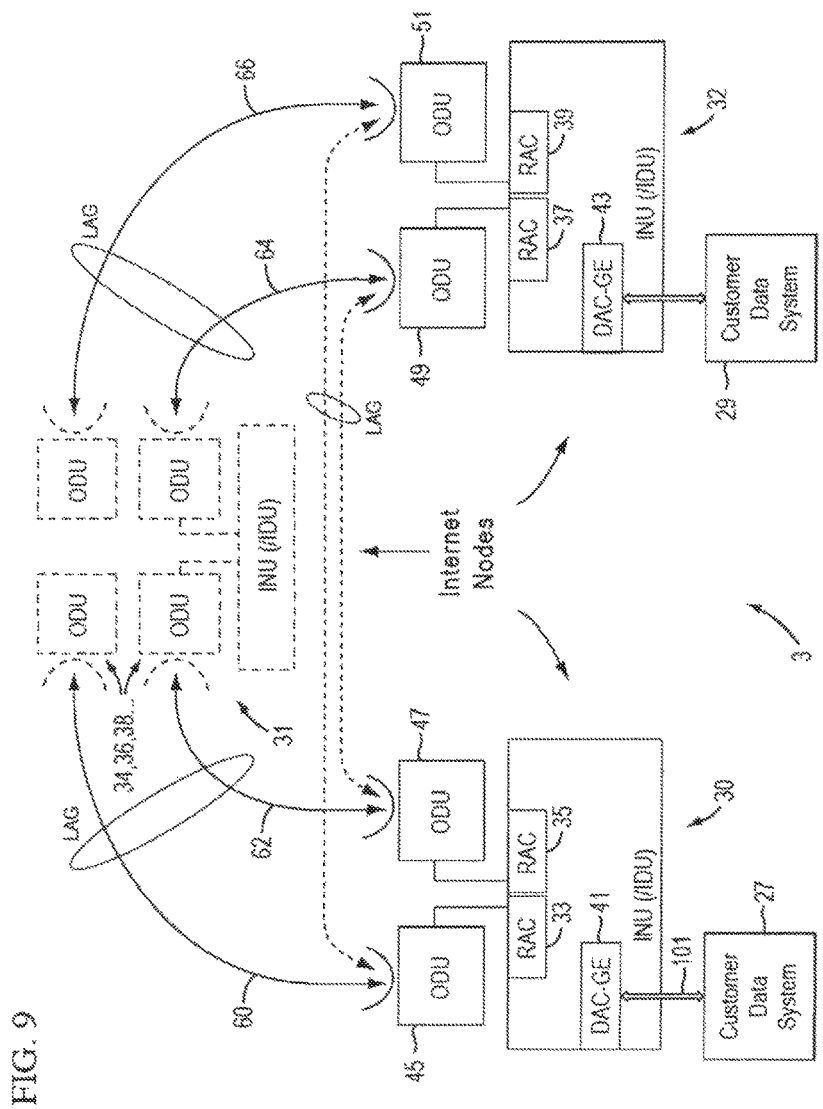
FIG. 9 is a diagram of a multi-node wireless network configuration with a DAC-GE for physical layer link aggregation.

In the next example, as shown in FIG. 9, the wireless communication system included at least three nodes. The DAC-GE 41,43 is deployed in the INU of at least two of the nodes 30,31,32. The DAC-GE includes functionality that enhances failure detection and recovery without compromising throughput, providing, for instance, below-50 ms failure response time. The DAC-GE interfaces with a customer data system 27, 29 on one side and with the radio access cards (RACs) 33, 35, 37, 39 on the other. The data from each RAC flows to a respective one of the ODUs (e.g., 45, 47, 49, 51; in a split mount system such as the Eclipse™) and through the wireless link 60, 62, 64, 66. As before, when a link aggregation group (LAG) is created, otherwise independent physical links 60,62, or 64,66, are respectively combined into a LAG to operate as members of a single virtual link (a single logical link).

Note that there could be multiple hops between nodes 30 and 32. Nevertheless, the failure detection and recovery operations of the DAC-GE are indifferent to the number of hops and they beneficially facilitate network end-to-end failure detection and recovery.

Moreover, while failure detection and recovery routing and switching can occur at the data link layer (layer-2) or a higher layer of the OSI model, preferably, failure detection operations are performed at the physical layer (layer-1 via the RCFD) and recovery operations are performed at the data link layer (via the layer-2 switch and shaper). While the data link layer is responsible for the integrity of each segment in the ring, the physical layer is better for implementing a faster mechanism for monitoring the integrity of the physical channels and detects any failures from end to end of the network. For instance, the physical layer can quickly detect absence of incoming data streams once a predetermined time threshold is reached and redefine the topology of the system (learning MAC addresses of alternate ports). This is not the same but is somewhat akin to the rapid spanning tree protocol.

Figure 10:
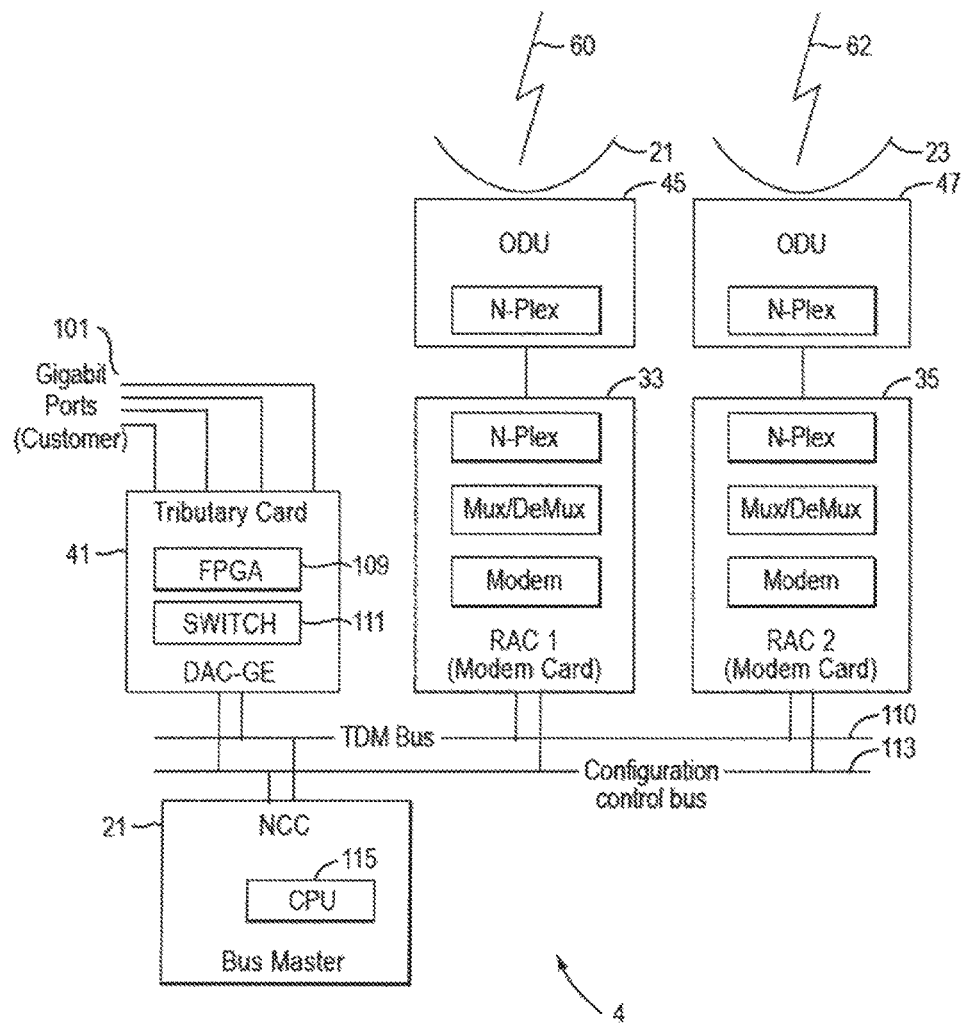
FIG. 10, is a block diagram of a physical layer link aggregation with the FPGA in a DAC-GE feeding a pair of ODUs via a TDM bus.

To further illustrate the foregoing, the block diagram in FIG. 10 illustrates the interface between a DAC-GE and two separate RACs to allow the interface to dual ODUs 45,47 from a single DAC-GE 41. In the INU, the TDM bus 110 provides the backbone through which various cards such as the node control card (NCC) 21, DAC-GE 41 and RACs 33,35 are connected. The NCC includes a processor 115 and functions as a bus master controlling access by the various cards including the DAC-GE card 41. Through the customer interface ports (Gigabit Ethernet ports) 101, the DAC-GE communicates with customer data systems, and the RACs 33,35 interfaces between the DAC-GE 41 and the wireless front-end, the ODU 45 and antenna 23.

As further shown, an FPGA 109 resides in the DAC-GE card 41 and its functionality is provided to facilitate the physical layer link aggregation, detection of carrier failures and redistribution of traffic among the remaining available carriers. The CPU 115 in the node control card (NCC) 21 performs a monitoring function that will reconfigure the switch 111 to the new capacity of the remaining available carriers. The traffic is distributed via the switch in the DAC-GE card but the CPU in the NCC card does the reconfiguration. In other words, the switch on the DAC-GE card is dynamically reconfigured under control of the CPU in the NCC card based on operation (failure detection etc.) of the FPGA.

Each transport channel has more than one virtual container's worth of capacity allocated to it (by reason of the logically grouped links). In the present example, each container can use an independent link (such as radio link) to transport the payload and the capacity of each transport channel can be 2×155 Mbps containers. In this case, because the link aggregation is made at the physical level, no particular information is used in the distribution of the frames over the different links and there is no intervention form the layer-2 switch. The layer-2 switch actually is not aware of the fact that the payload is split into two different links. The information available to a layer-2 switch is limited to the transport channel capacity according to which the switch will shape the traffic payload (i.e., transmission rate).

For load balancing, frames provided to the FPGA at the transmit (TX) end are each split (segmented), preferably uniformly, or alternatively, based on capacity or speed of the transport channels. The segmentation can be done on a byte, word, packet or other suitable boundary, so long as the TX and RX ends are aligned (both RX and TX are configured for the same boundaries so that the frames are well bounded in all cases). While at the TX end the frames are segmented, at the receive end the frame segments are reassembled (with proper alignment, e.g., as shown in FIG. 7B) to produce the original frames.

In one implementation, both ends, TX and RX, handle one frame at a time, exclusively. In such serial operation, one or more iterations may be performed. Namely, transporting all the segments may require more than one iteration when the number of segments is larger than the number of carriers, as each segment is assigned to a carrier. In another embodiment, more than one frame is transported simultaneously. In such parallel operation, the segments of multiple frames can be processed simultaneously by allocating to each of them a subset of carriers from among the total pool of carriers.

Frames segmentation, reassembly and the ability to reorganize them in the event of failure facilitate the desired resilience. With such resilience, if any carrier fails, the remaining channels can be used to transport the frames (i.e. payload traffic can continue using the remaining capacity).

Preferably, the FPGA used to implement a featureless link aggregation is designed to apply extended failure detection. In particular, the failure detection is extended from an application of the RCFD to all the carriers at once (i.e., the entire transport channel) to a per-carrier application of the RCFD algorithm. With a per-carrier RCFD, individual carrier failures can be detected and isolated, and then, when carriers recover, they can be individually brought back online. Failures can be established using a carrier status appended to frames. The respective status determinations for a per-carrier approach and for an entire transport channel (all-or-nothing) approach have common failure detection steps. However, in a per-carrier approach, once the status of each individual carrier is determined, the status determination for the entire transport channel can be derived by combining the individual carrier status values through an OR calculation or other suitable operation. Consequently, only if all the carriers have failed the status of the entire transport channels becomes 'bad' otherwise it stays 'good'. This is unlike the 'all-or-nothing' approach where if one of the carriers fails the entire transport channel becomes 'bad' and the entire physical layer link aggregation collapses and stops delivering frames traffic.

Figure 11:
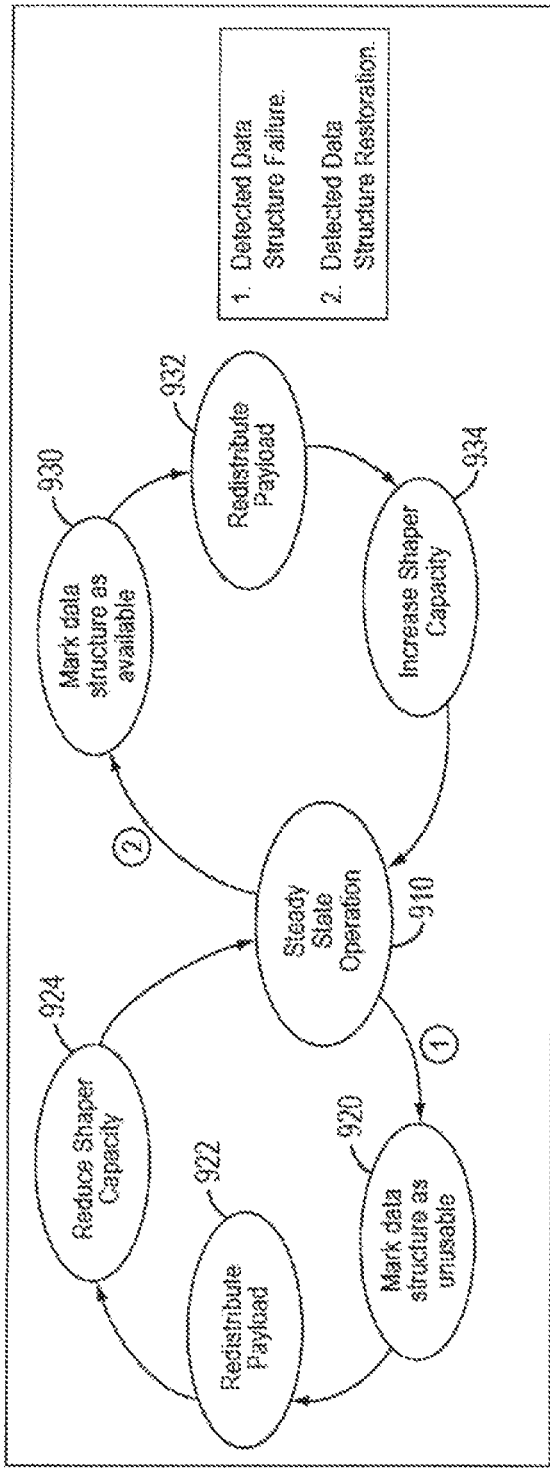
FIG. 11 is a link aggregation payload redistribution state diagram.

FIG. 11 is a state diagram illustrating RCFD link failure and restoration executed by a DAC-GE detecting a link failure in one of the active ports of the network topology. Additionally, the state diagram also shows the steps executed when a failed link is restored. It is important to mention that in some networks the original topology will not be restored after the detection of a link restoration. As shown, when application of the RCFD on a per-carrier basis uncovers failure of one or more carriers, a state transition 1 from steady state operations 910 involves marking the associated data structures as 'unusable' (their status is 'bad') 920. Consequently, the payload traffic is redistributed among the remaining carriers 922 and the shaper (switch component) adjusts the frame transmission rate to the remaining capacity based on the reduced traffic capacity 924. When the per-carrier application of the RCFD uncovers carrier recovery, a state transition 2 involves marking the associated data structures as 'available' (their status is 'good') 930. Consequently, the payload traffic can be redistributed among the increased number of carriers 932 and the shaper increases the frame transmission rate based on the increased traffic capacity 934.

In some embodiments, one of the requirements for the failure detection algorithm is to be independent from the presence of payload traffic in the channel. To be able to meet such a requirement, the algorithm is designed to detect the absence of payload traffic (idle) and insert keep-alive packets that will maintain the link status. The format of a keep-alive packet is basically the same as a normal payload packet format but without the payload segment and it conveys the same status and integrity information.

In addressing resiliency under various traffic conditions, a DAC-GE design for RWPLLA includes implementation of the aforementioned RCFD algorithm for detecting failures in individual carriers. The design of the RCFD algorithm includes a number of possible considerations, some more important than others. One such design consideration is backwards compatibility with existing Gigabit Ethernet card frameworks. It is also desirable to design the algorithm to be resilient to noise and small error bursts. For instance, if an uncorrectable frame is sent out by the radio link the transport channel status should not be changed, i.e., single packet errors should not trigger a status change.

Also, it is preferable to make the rapid channel failure detection algorithm an end-to-end solution. That is, the algorithm should be agnostic to the number of hops required by the transport channel to get the payload across the radio link (presence of repeaters). Moreover, the rapid channel failure detection algorithm should be able to resolve failures in either direction independently (i.e., unidirectional failures).

Radio link fades and outages occur due to natural conditions and they are typically bidirectional, but hardware failures may not be. The failure of a power amplifier, or transmit (TX) or receive (RX) synthesizer, for example, would cause a unidirectional failure. The algorithm should be capable of detecting and indicating independently when the failure occurred and whether it took place in the transmit or receive direction. Some applications may benefit from the possibility of having unidirectional traffic still going through. Link aggregation for example may benefit from having two channels transmitting in one direction and only one coming back.

Moreover, the rapid channel failure detection algorithm is preferably autonomous in the detection of a failure in that it does not depend on other alarms or signals available in the system to determine the failure. Such algorithm is also independent from the presence of payload traffic.

In addition to being autonomous, the rapid channel failure detection algorithm is preferably designed to automatically recover from a failure. For instance, if the protocol used to implement the failure detection remains in operation (attempting to re-establish communication with the far-end) after a failure takes place, it will be able to recover automatically when the link is restored.

Apart from the foregoing, one typical design requirement is fast (preferably below 50 ms) failure detection capability. To this end, the configuration and management processor is preferably not involved in the rapid channel failure detection algorithm and it does not use the out of band network management system (NMS) overhead channel present in the link to convey decision information or status. Additionally, the algorithm is designed to perform its functions with the least amount of bandwidth (overhead) possible. Again, this protocol is preferably embodied as a hardware-assisted protocol implementation. Ethernet frame encapsulation is therefore designed to accommodate these requirements. Specifically, the addition of a header field extension allows redundancy and status information to be transferred without too much additional overhead. The extra header field conveys RX and TX status information and provides integrity check of the header information.

Figure 12:
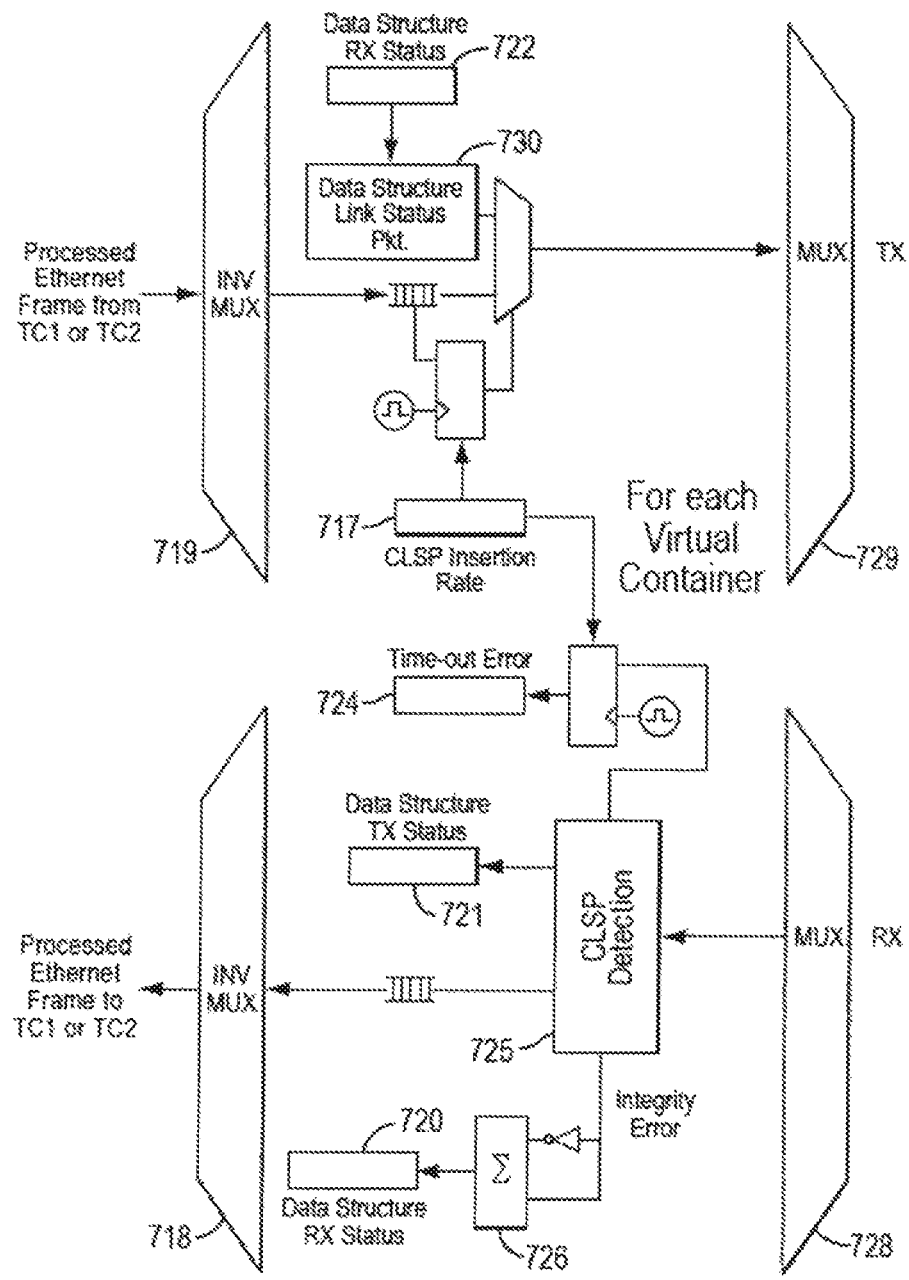
FIG. 12 is a block diagram of a carrier link portion of the FPGA in a DAC-GE; the figure illustrates the insertion and extraction of the overhead information that is ultimately used for rapid failure detection for each virtual container.

As to the status, FIG. 12 is a block diagram of a carrier link portion of the FPGA (field programmable gate array) in a DAC-GE. In this embodiment, a carrier link status packet (CLSP) 730 is a small packet that is inserted into the Ethernet frame at regular intervals and uses the stuffing rules of HDLC-like packet structure to avoid interfering with the true payload. The CLSP insertion intervals are dependent on the CLSP insertion rate 717 so that the RCFD algorithm may be independent from the presence of payload traffic in the carrier channel. The insertion occurs in the presence of absence of payload traffic, and a CLSP appear as a special signature within a frame that can be easily detected at the far end of a link. Accordingly, carrier TX and RX status information for each end of link is kept in the DAC_GE by the FPGA. The RX status is computed based on information obtained from the CLSP packets and their integrity (e.g., checksum). The carrier TX status is a reflection of a far-end carrier RX status indicator conveyed in the CLSPs. The status of an entire transport channel is the status sum of all carrier channels. As further shown, in this embodiment for each carrier channel (virtual container) there is a set of configurable registers for adjusting the behavior of the system to meet carrier class specifications. These registers include a carrier link status packet insertion rate register 717, an integrity validation threshold register 725 and an integrity error threshold register 726.

Figure 13:
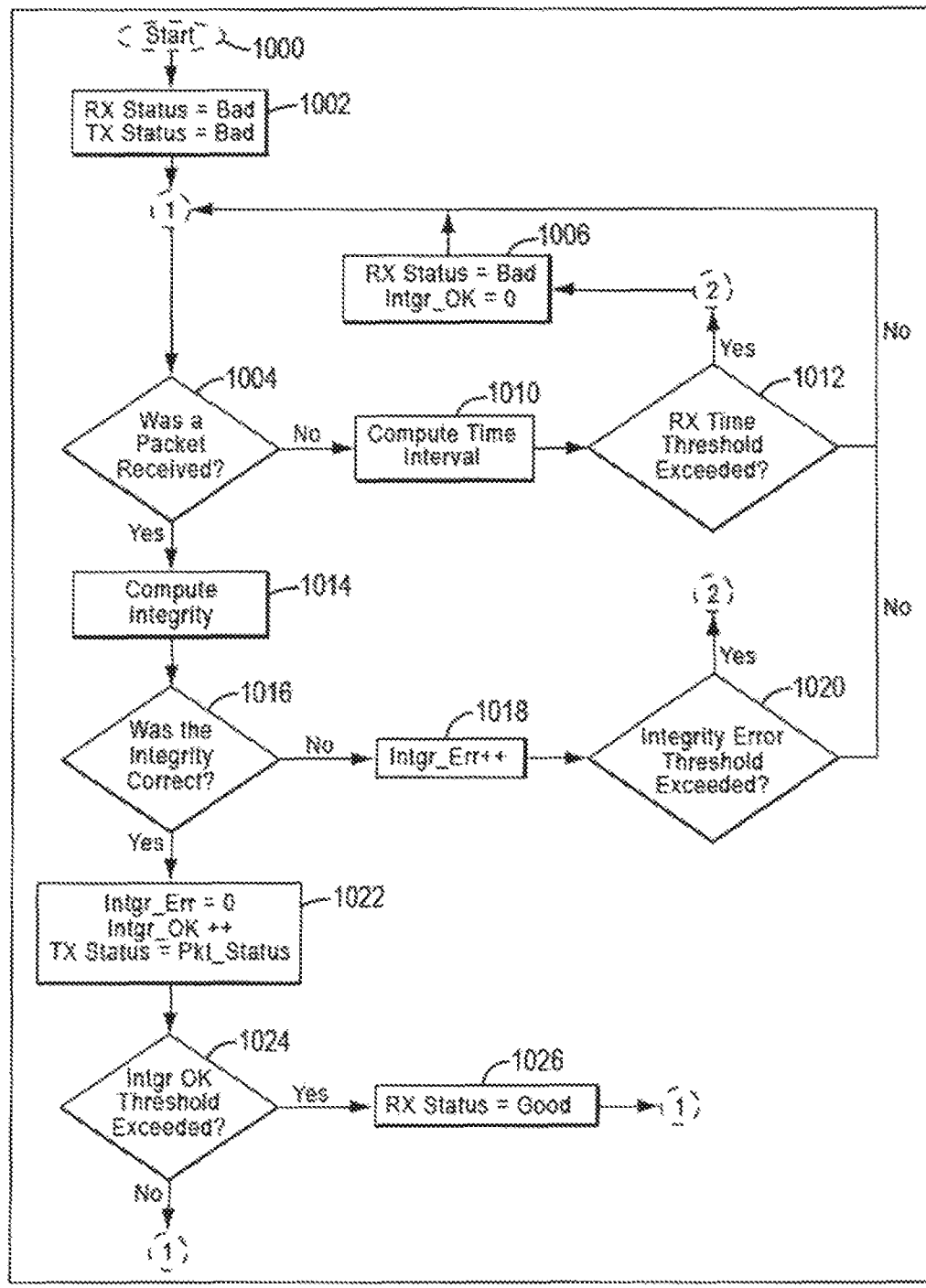
FIG. 13 is a flow diagram of a method for rapid channel failure detection and recovery.

In addition to being independent of the presence or absence of payload traffic, RCFD algorithm is may discover unidirectional link failures in that TX failure detection is independent of RX failure detection. FIG. 13 is a flow diagram illustrating the preferred failure detecting and recovery algorithm. This diagram shows RCFD algorithm including the TX and RX status updates and recovery conditions.

Initially, a default value of the status indicates RX and TX status being bad 1002. Subsequently, a number of conditions may be used to detect an error, which either perpetuates a bad status or converts a good status to bad. Examples of such conditions are packet received timeout and integrity error threshold exceeded. In the receive direction, wirelessly transmitted frames are expected to arrive at a RAC 1004. If the time interval in which frames are absent 1010 exceeds a predetermine frame receive threshold which means that it reaches packet received timeout condition 1012, the RX status is set to 'bad' and the integrity status is set to 'OK' 1006. The packet received timeout condition indicates that there has been an unexpectedly long period of time during which no packets have been received. However, if frames are received timely 1004, such frames may contain multiple packet segments with associated time slots that are used in connection with transporting the payload.

Although not shown here, one way to improve the integrity of the packets is through byte synchronization that uses the overhead information to offset time differences that each of the independent links use for transporting payload effectively aligning the packets to their original layout. If this alignment fails, a traffic alignment error can be used as an alarm indicating that the local receiver has not yet synchronized with the far end transmitter.

Another or an additional way to improve the integrity of the packets is to compute the integrity value, e.g., CRC, checksum or other, and to compare it with a known integrity value (1014 and 1016). If the computed integrity value doesn't match the known integrity value, there is an integrity error and the integrity error counter is incremented 1018. If such integrity error counter exceeds the integrity error threshold 1020, such condition indicates that the last n consecutive packets received had an integrity error and that, therefore, the channel is not reliable. In this case, n is a configurable parameter that will change according to the transport channel capacity. If the integrity value is correct (a match is found) 1016, the integrity error counter is reset (set=0), the integrity 'OK' counter is incremented and TX status is set to match the packet status 1022. However, before declaring a link's status as good, the number of consecutive packets with correct integrity (i.e., the integrity 'OK' counter) needs to exceed the integrity 'OK' threshold value. The number of consecutive packets used to declare a carrier link status as good is usually smaller than the number of consecutive bad packets used to declare a carrier link status as bad. This prevents oscillation and provides a good confidence level for the transition to take place. Having such threshold as a configurable parameter, allows the system administrator to choose the confidence level he wants for a good link status. Accordingly, if the integrity 'OK' counter exceeds the integrity 'OK' threshold 1024, the RX status is deemed 'good' 1026 or is converted to 'good' if it was initially 'bad'. Otherwise it either stays 'bad' if it was initially 'bad' or it is converted to 'bad' if it was initially 'good.' Additional frames are expected and the cycle repeats (at point '1') for each of them, except that the status may be initially 'good' or 'bad' based on the history of previous frames.

Any of the foregoing timeout or error conditions described above may indicate a bad receive (RX) status and all of them will have to be absent in order to declare a good RX status. The RX status (good or bad) will be added to all packet headers associated with it's transport channel, notifying the far end node in this way of the current receive conditions. The TX status (set on step 1022) therefore is a reflection of the far end node RX status as reported over packets with good integrity. The far end RX status contained in bad packets shall be ignored.

In order to meet carrier class failure detection expectations, the configurable threshold and parameters of the failure detection algorithm can be adjusted according to the different capacities allocated to the transport channel. For instance, the number of successive packets in error can be adjusted to filter out error bursts and provide a confidence level for the error detection. The keep-alive packet insertion rate can also be tuned depending on the expected traffic load to achieve better response time. For a high utilization percentage the use of keep-alive messages will have a low probability of occurrence, whereas in low utilization percentages these messages will be inserted on regular basis.

Of course, it is beneficial and preferred that once a failure is detected the algorithm continues to work. To that end, the insertion of keep-alive messages and CLSPs to recover the link status needs to be maintained even if the payload traffic has stopped to flow in the affected transport channel. These keep-alive messages will carry all the information required to recover to a good link status once the impairment that caused the failure is removed.

In sum, although various embodiments have been described in considerable detail, other versions and applications of the resilient physical layer link aggregation combined with the rapid transport failure detection algorithm and DAC-GE are possible. Therefore, the spirit and scope of the appended claims should not be limited to the description of the preferred versions contained herein.

What is claimed is:

1. A method of providing resilient data communications, comprising:
   using a physical-layer link-aggregation circuit at a physical layer of a network to aggregate wireless links in the network to generate a virtual channel for data communications;
   receiving a current group of one or more data frames for transmission over the virtual channel;
   segmenting the current group of one or more data frames to generate current data frame group segments;
   allocating the current data frame group segments across the wireless links of the virtual channel;
   transmitting the current data frame group segments across the wireless links of the virtual channel according to the allocating;
   detecting, by a failure detection circuit at the physical layer, a link failure of a particular wireless link of the virtual channel; and
   allocating first future data frame group segments away from the particular wireless link to at least one other wireless link of the virtual channel after the detecting of the link failure of the particular wireless link to render data communications through the virtual channel resilient to the link failure of the particular wireless link.

2. The method of claim 1, wherein the link failure occurs only in one direction, and wherein the allocating the first future data frame group segments away from the particular wireless link occurs only in the one direction.

3. The method of claim 1, wherein the allocating the current data frame group segments and the allocating the first future data frame group segments are not based on a feature of any of the data frames.

4. The method of claim 1, further comprising assigning a 'good' status condition for the virtual channel, and maintaining the 'good' status condition for the virtual channel unless all of the wireless links of the virtual channel fail.

5. The method of claim 1, further comprising:
   monitoring for a recovery of the particular wireless link from the link failure; and
   automatically redistributing second future data frame group segments to the particular wireless link after detecting the recovery of the particular wireless link.

6. The method of claim 1, wherein a data access card performs the steps of using the physical-layer link-aggregation circuit at the physical layer of the network to aggregate wireless links in the network to generate the virtual channel and of allocating the first future data frame group segments away from the particular wireless link to the at least one other wireless link of the virtual channel by managing ports associated with the data access card.

7. The method of claim 1, wherein the step of detecting, by the failure detection circuit at the physical layer, the link failure includes monitoring for a failure in at least one of traffic alignment, packet delay, or packet integrity.

8. The method of claim 1, wherein:
each wireless link of the virtual channel communicates the current data frame group segments between at least a first node and a second node;
the at least the first and second nodes have an associated transmit status and an associated receive status, the transmit status associated with the first node being a reflection of the receive status associated with the second node; and
the step of detecting, by the failure detection circuit at the physical layer, the link failure includes detecting a failure in at least one of the transmit status or the receive status.

9. The method of claim 8, further comprising formatting packets at the first node with an extended header field that contains the receive status associated with the first node, a cyclic redundancy checksum (CRC), and the transmit status associated with the first node.

10. The method of claim 8, further comprising:
determining at the second node whether each of the packets from the first node has valid integrity; and
determining a 'good' transmit status or a 'good' receive status by detecting that a predetermined number of successive packets have valid integrity.

11. The method of claim 1, wherein the segmenting the current group of one or more data frames includes segmenting the current group of one or more data frames to a segment size based on one or more link capacities or link speeds of the wireless links of the virtual channel.

12. The method of claim 1, wherein the segmenting the current group of one or more data frames includes segmenting the current group of one or more data frames to a uniform segment size.

13. A system for providing resilient data communications, comprising:
a physical-layer link-aggregation system at a physical layer of a network configured to aggregate wireless links in the network to generate a virtual channel for data communications;
at least one port configured to receive a current group of one or more data frames for transmission over the virtual channel;
an inverse multiplexing circuit configured to segment the current group of one or more data frames to generate current data frame group segments for transmission across the wireless links of the virtual channel;
a transmitter configured to transmit the current data frame group segments across the wireless links of the virtual channel;
a failure detection circuit configured to detect, at the physical layer, a link failure of a particular wireless link of the virtual channel; and
a redistribution mechanism in communication with the failure detection circuit and configured to automatically redistribute first future data frame group segments away from the particular wireless link to at least one other wireless link of the virtual channel after the detecting of the link failure of the particular wireless link to render data communications through the virtual channel resilient to the link failure of the particular wireless link.

14. The system of claim 13, wherein the link failure occurs only in one direction, and wherein the redistribution mechanism redistributes the first future data frame group segments away from the particular wireless link only in the one direction.

15. The system of claim 13, wherein the redistribution mechanism redistributes the first future data frame group segments not based on a feature of any of the data frames.

16. The system of claim 13, further comprising a virtual channel manager for assigning a 'good' status condition for the virtual channel, and maintaining the 'good' status condition for the virtual channel unless all of the wireless links of the virtual channel fail.

17. The system of claim 13, further comprising a recovery manager configured to monitor for a recovery of the particular wireless link from the link failure, and to automatically redistribute second future data frame group segments to the particular wireless link after detecting the recovery of the particular wireless link.

18. The system of claim 13, further comprising a data access card that manages ports associated with the data access card.

19. The system of claim 13, wherein the failure detection circuit monitors, at the physical layer, for a failure in at least one of traffic alignment, packet delay, or packet integrity.

20. The system of claim 13, wherein:
each wireless link of the virtual channel communicates the current data frame group segments between at least a first node and a second node;
the at least the first and second nodes have an associated transmit status and an associated receive status, the transmit status associated with the first node being a reflection of the receive status associated with the second node; and
the failure detection circuit detects, at the physical layer, a failure in at least one of the transmit status or the receive status.

21. The system of claim 20, wherein the first node formats packets with an extended header field that contains the receive status associated with the first node, a cyclic redundancy checksum (CRC), and the transmit status associated with the first node.

22. The system of claim 21, wherein:
the second node includes the failure detection circuit; and
the failure detection circuit determines whether each of the packets from the first node has valid integrity, and determines a 'good' transmit status or a 'good' receive status by detecting that a predetermined number of successive packets have valid integrity.

23. The system of claim 13, further comprising a load balancer configured to segment the current group of one or more data frames to a data frame group segment size based on one or more link capacities or link speeds of the wireless links of the virtual channel.

24. The system of claim 13, further comprising a load balancer configured to segment the current group of one or more data frames to a uniform segment size.

25. A method of providing resilient data communications, comprising:
using a physical-layer link-aggregation circuit at a physical layer of a network to aggregate wireless links between a first node and a second node to generate a virtual channel for data communications;
receiving by the first node a group of one or more data frames for transmission over the virtual channel;
segmenting by the first node at least the group of one or more data frames to generate data frame group segments, the data frame group segments including a wireless link status indication indicating the receive status of a particular wireless link of the virtual channel;

allocating by the first node the data frame group segments across the wireless links of the virtual channel; and transmitting by the first node the current data frame group segments across the wireless links of the virtual channel according to the allocating to the second node, the second node using the wireless link status indication to generate a transmit status of a particular wireless link as good or bad, the second node using the transmit status to identify a link failure in a transmit direction of the particular wireless link of the virtual channel.

26. A system of providing resilient data communications, comprising:

a physical-layer link-aggregation circuit at a physical layer of a network configured to aggregate wireless links between a first node and a second node to generate a virtual channel for data communications;

at least one port on the first node configured to receive by the first node a group of one or more data frames for transmission over the virtual channel;

an inverse multiplexing circuit on the first node configured to segment at least the group of one or more data frames to generate data frame group segments, the data frame group segments including a wireless link status indication indicating the receive status of a particular wireless link of the virtual channel; and a transmitter on the first node configured to transmit the current data frame group segments across the wireless links of the virtual channel according to the allocating to the second node, the second node configured to use the wireless link status indication to generate a transmit status of a particular wireless link as good or bad, the second node using the transmit status to identify a link failure in a transmit direction of the particular wireless link of the virtual channel.

* * * * *